(12) United States Patent
Limburg et al.

(10) Patent No.: US 12,235,219 B2
(45) Date of Patent: *Feb. 25, 2025

(54) METHOD OF DETERMINING A CONCENTRATION OF AN ANALYTE IN A BODILY FLUID

(71) Applicant: Roche Diabetes Care, Inc., Indianapolis, IN (US)

(72) Inventors: Bernhard Limburg, Soergenloch (DE); Max Berg, Mannheim (DE); Fredrik Hailer, Limburgerhof (DE); Volker Tuerck, Berlin (DE); Daria Skuridina, Berlin (DE); Irina Ostapenko, Berlin (DE)

(73) Assignee: Roche Diabetes Care, Inc., Indianapolis, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/516,492

(22) Filed: Nov. 21, 2023

(65) Prior Publication Data

US 2024/0085340 A1 Mar. 14, 2024

Related U.S. Application Data

(63) Continuation of application No. 17/334,284, filed on May 28, 2021, now Pat. No. 11,906,436, which is a (Continued)

(30) Foreign Application Priority Data

Nov. 30, 2018 (EP) .................................... 18209466

(51) Int. Cl.
*G01N 21/84* (2006.01)

(52) U.S. Cl.
CPC ................................ *G01N 21/8483* (2013.01)

(58) Field of Classification Search
CPC .. G01N 21/8483; G01N 21/78; G01N 21/272; G01N 33/50; G01N 33/52;
(Continued)

(56) References Cited

U.S. PATENT DOCUMENTS

| | | | |
|---|---|---|---|
| 6,448,067 | B1 | 9/2002 | Tajnaföi |
| 11,906,436 | B2 * | 2/2024 | Limburg ............ G01N 21/8483 |

(Continued)

FOREIGN PATENT DOCUMENTS

| | | |
|---|---|---|
| CN | 104854457 A | 8/2015 |
| CN | 106068449 A | 11/2016 |

(Continued)

OTHER PUBLICATIONS

International Search Report and Written Opinion of the International Searching Authority, PCT/EP2019/083015, Mar. 2, 2020, 12 pages.

(Continued)

*Primary Examiner* — Michael J Vanchy, Jr.
(74) *Attorney, Agent, or Firm* — Bose McKinney & Evans LLP

(57) ABSTRACT

A method of determining analyte concentration in a body fluid with a mobile device having a camera. A user is prompted to apply body fluid to an optical test strip and then waits a predetermined minimum waiting time. The camera captures an image of part of the test field having the body fluid applied thereto. Analyte concentration is determined based on the image captured. The determination includes estimating a point in time of sample application to the test field by taking into account time-dependent information derived from the image captured using a first color channel of a color space. The determination also estimates the concentration of the analyte by taking into account concen- (Continued)

tration-dependent information derived from the image using a second color channel of the color space.

12 Claims, 7 Drawing Sheets

Related U.S. Application Data continuation of application No. PCT/EP2019/083015, filed on Nov. 29, 2019.

(58) Field of Classification Search
CPC ......... G01N 21/274; G01N 2021/8488; G01N 33/5094; G01N 33/66; G01N 33/48771; A61B 2562/0295
See application file for complete search history.

(56) References Cited

U.S. PATENT DOCUMENTS

| | | | |
|---|---|---|---|
| 2013/0267032 A1* | 10/2013 | Tsai | G06F 18/22 436/95 |
| 2013/0273563 A1 | 10/2013 | Ehrenkranz | |
| 2015/0037898 A1 | 2/2015 | Baldus et al. | |
| 2015/0241358 A1 | 8/2015 | Burg et al. | |
| 2015/0359458 A1* | 12/2015 | Erickson | G06T 7/90 382/133 |
| 2016/0011120 A1 | 1/2016 | Ringemann et al. | |
| 2016/0011178 A1 | 1/2016 | Hoenes et al. | |
| 2017/0098137 A1 | 4/2017 | Burg et al. | |
| 2017/0262694 A1 | 9/2017 | Bowden et al. | |
| 2020/0080942 A1 | 3/2020 | Chen et al. | |

FOREIGN PATENT DOCUMENTS

| | | |
|---|---|---|
| EP | 2 259 058 A1 | 12/2010 |
| JP | 58-63854 A | 4/1983 |
| JP | 01-026507 B2 | 5/1989 |
| JP | 2015-536465 A | 12/2015 |
| JP | 6179932 B2 | 8/2017 |
| JP | 2020-514752 A | 5/2020 |
| KR | 10-2015-0119364 A | 10/2015 |
| KR | 10-2016-0133345 A | 11/2016 |
| WO | WO 01/86302 A1 | 11/2001 |
| WO | WO 2007/079843 A2 | 7/2007 |
| WO | WO 2013/149598 A1 | 10/2013 |
| WO | WO 2018/166533 A1 | 9/2018 |

OTHER PUBLICATIONS

Hönes et al., Diabetes Technology and Therapeutics, vol. 10, Supplement 1, 2008, pp. 10-26.

* cited by examiner

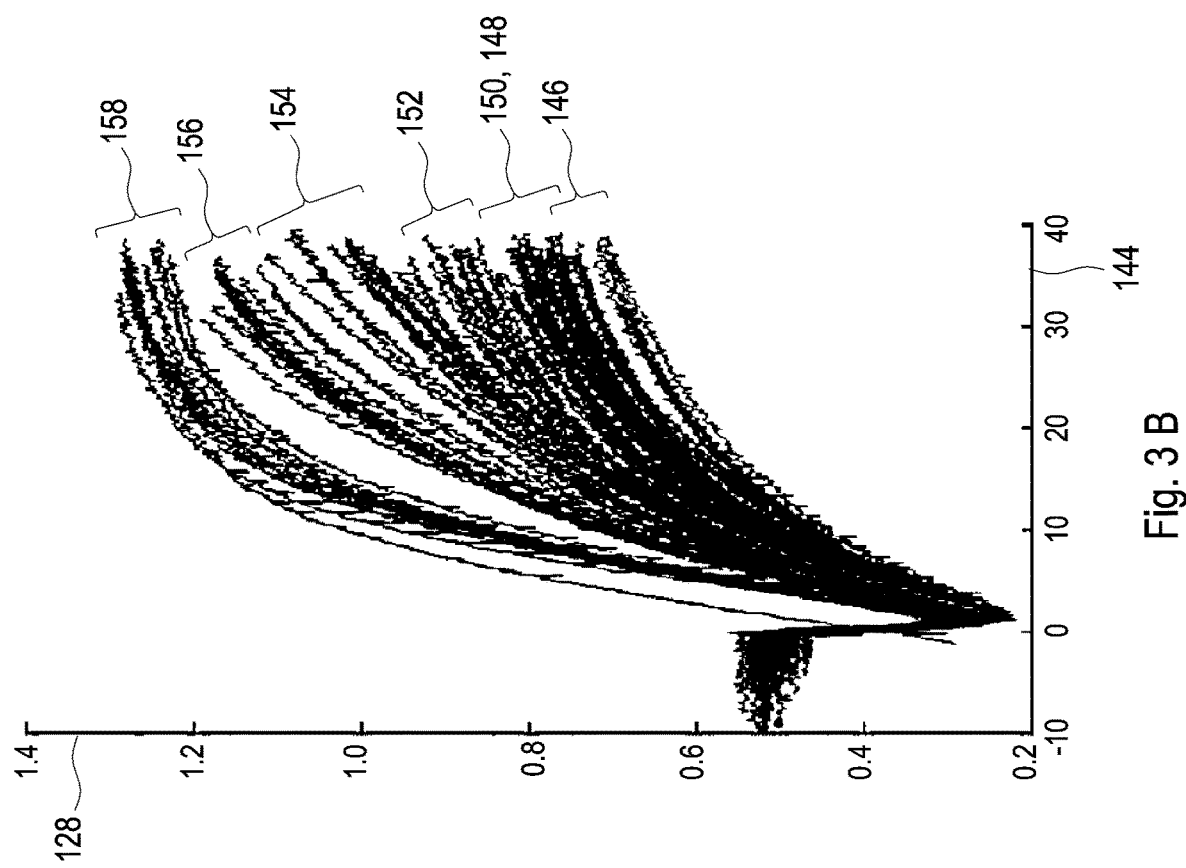
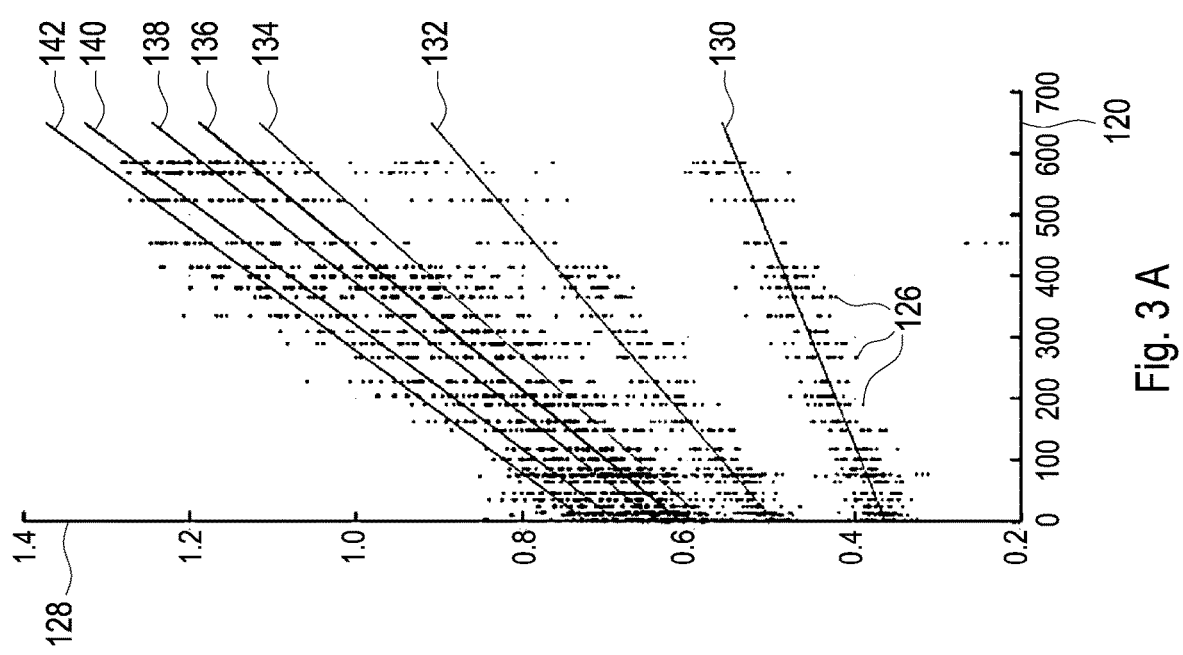

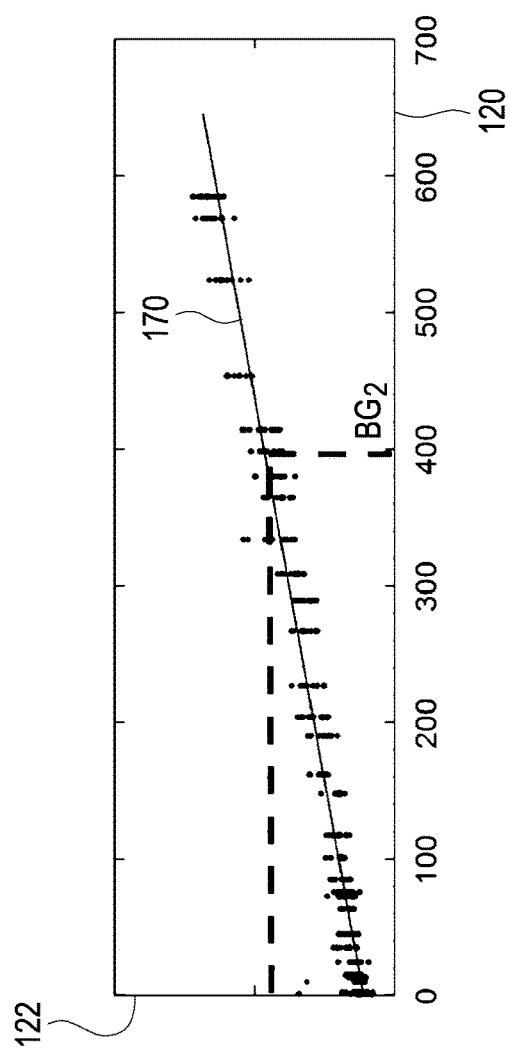
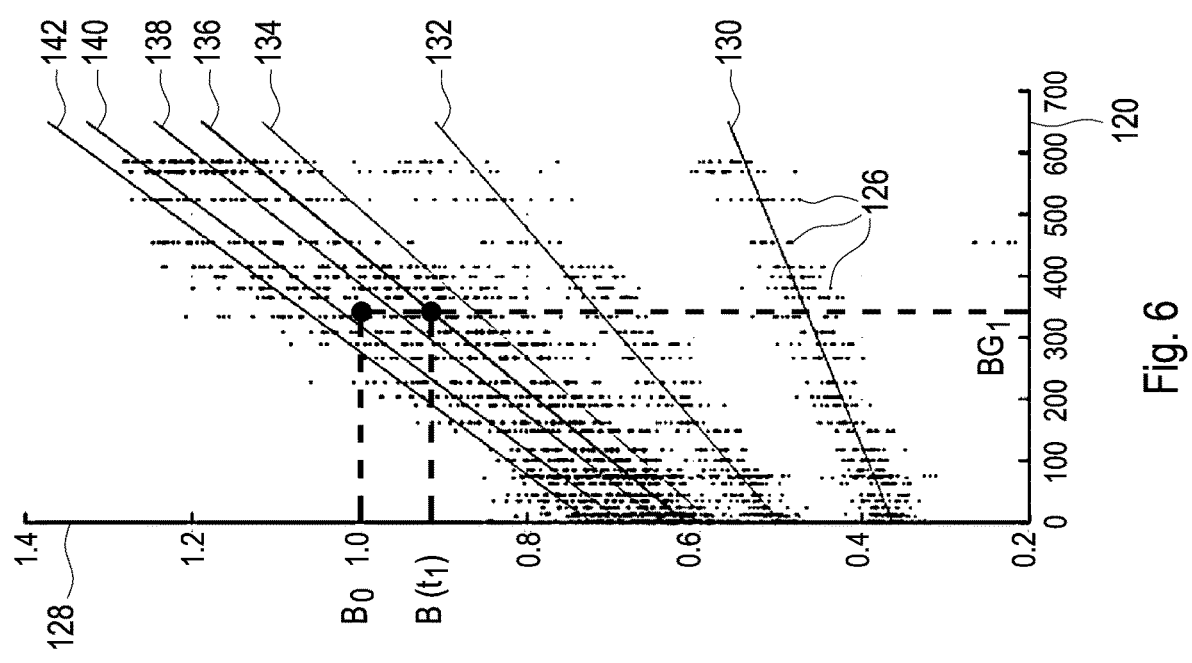
Fig. 7
Fig. 6

METHOD OF DETERMINING A CONCENTRATION OF AN ANALYTE IN A BODILY FLUID

RELATED APPLICATIONS

This application is a continuation of U.S. patent application Ser. No. 17/334,284, filed May 28, 2021, which is a continuation of International Application No. PCT/EP2019/083015, filed Nov. 29, 2019, which claims priority to European Patent Application No. 18 209 466.4, filed Nov. 30, 2018, the entire disclosures of all of which are hereby incorporated herein by reference.

BACKGROUND

The present application refers to a method of determining a concentration of an analyte in a bodily fluid by using a mobile device having a camera. This disclosure further relates to a computer program including computer-executable instructions for performing the method, a mobile device having a camera, the mobile device being configured for determining a concentration of an analyte in a bodily fluid and a kit for determining a concentration of an analyte in a bodily fluid, the kit comprising at least one mobile and at least one optical test strip having at least one test field.

In the field of medical diagnostics, in many cases, one or more analytes have to be detected in samples of a body fluid, such as blood, interstitial fluid, urine, saliva or other types of body fluids. Examples of analytes to be detected are glucose, triglycerides, lactate, cholesterol or other types of analytes typically present in these body fluids. According to the concentration and/or the presence of the analyte, an appropriate treatment may be chosen, if necessary. Without narrowing the scope, this disclosure specifically will be described with respect to blood glucose measurements. It shall be noted, however, that this disclosure may also be used for other types of analytical measurements using test strips.

Generally, devices and methods known to the skilled person make use of test strips comprising one or more test chemistries, which, in presence of the analyte to be detected, are capable of performing one or more detectable detection reactions, such as optically detectable detection reactions. With regard to these test chemistries, reference may be made, e.g., to J. Hoenes et al.: The Technology Behind Glucose Meters: Test Strips, Diabetes Technology & Therapeutics, Volume 10, Supplement 1, 2008, S-10 to S-26. Other types of test chemistry are possible and may be used for performing this disclosure.

Typically, one or more optically detectable changes in the test chemistry are monitored, in order to derive the concentration of the at least one analyte to be detected from these changes. For detecting the at least one change of optical properties of the test field, various types of detectors are known in the art. Thus, various types of light sources for illuminating the test fields as well as various types of detectors are known. In general, variable lighting conditions need to be taken into account.

Thus, for example, WO 2007/079843 A2 discloses a method for measuring a concentration of an analyte contained in a sample of a biological fluid using a test strip and a camera. The analyte concentration in the sample is determined based on the color values with the aid of predefined comparative values.

U.S. Publication No. 2013/0267032 A1 describes a specimen test strip to detect a characteristic of an analyte in a specimen sample. The specimen test strip includes a reaction area to receive the specimen sample and a color calibration area to determine a color, or a color and a color intensity, of the reaction area after receiving the specimen sample. The specimen test strip may further include a temperature indication area to correct a measurement of the characteristic of analyte.

WO 2018/166533 A1 describes example methods to improve placement of an adaptor to a mobile computing device to measure a test strip coupled to the adaptor with a camera and a screen on a face of the mobile computing device. The method may include displaying a light area on a first portion of the screen. The first portion may be adjacent to the camera. The light area and the camera may be aligned with a key area of the test strip so that the camera is configured to capture an image of the key area. The method may further include providing first guiding information for a user to place the adaptor to the mobile computing device according to a position of the light area on the screen.

U.S. Publication No. 2017/0262694 A1 describes an improved colorimetric analysis of liquid samples. A sample holder is used that delivers predetermined volumes of sample individually to each of several colorimetric test patches at the same time with a sliding action. An opaque housing is employed to prevent ambient light from reaching the test patches when color images of the test patches are acquired. Preferably, a mobile electronic device including a camera is attached to the opaque housing to acquire the images. Optical microscopy can be performed in addition to the colorimetric analysis.

U.S. Publication No. 2015/0037898 A1 describes devices and methods for determining concentration of at least one analyte in a body fluid sample such as blood, especially a blood glucose concentration. In the methods, a test element is provided that has at least one reagent element configured so as to carry out at least one optically detectable detection reaction in the presence of the analyte. The body fluid sample is applied to the test element and a time course of at least one optical measurement variable of the reagent element is detected. At least one first time interval of the time course of the optical measurement variable is used to determine at least one disturbance variable value in the body fluid sample, in particular a concentration of a disturbance variable such as hematocrit. At least one second time interval of the time course is used to determine analyte concentration. The at least one disturbance variable value can be used to correct/compensate the analyte concentration.

EP 2 259 058 A1 describes a method of measuring hematocrit value and a device for measuring hematocrit value which can measure hematocrit value accurately. A method of measuring hematocrit value of a blood sample in a chromogenic reaction using a chromogenic reagent that reacts with a blood component that is different from hemoglobin, characterized by: calculating the hematocrit value of the blood sample based on an optical characteristic a1 of the blood sample measured with a light λ1 of at least one absorption wavelength specific to hemoglobin and an optical characteristic a2 of the blood sample measured with a light λ2 of at least one absorption wavelength specific to a pigment generated in the chromogenic reaction.

U.S. Publication No. 2015/0241358 A1 describes an apparatus for automatic test diagnosis of a test paddle. The apparatus comprises a personal computing device including: a camera to capture images over time of test pads of a test paddle, a processor coupled to the camera, and a display device coupled to the processor. The processor analyzes the color changes over time of each test pad to determine a color trajectory over time for each test pad. The processor compares the color evolution trajectory for each test pad with color calibration curves for each test pad to determine an analyte concentration of a test biological sample, such as urine. During the analysis by the processor, the display device displays a user interface with results of the analyte concentration in response to the analysis over time.

Further, WO 2013/149598 A1 describes test strips and a method for reading test strips. A specimen test strip is provided to detect a characteristic of an analyte in a specimen sample. The test strip includes a reaction area to receive the specimen sample and a color calibration area to determine a color, or a color and a color intensity, of the reaction area after receiving the specimen sample. The specimen test strip may further include a temperature indication area to correct a measurement of the characteristic of analyte. Inter alia, the document proposes using first and second color components, wherein the multiple images are captured. The second color component is used to determine an appropriate time to read the first color component, and the first color component is read at that time to determine the value of the analyte characteristic.

The known methods and devices, despite their advantages, still imply a plurality of challenges. Thus, specifically, the necessity for using customized detectors as well as the complexity of the procedure and the corresponding need for resources and time is to be mentioned. As an example, the method disclosed by WO 2013/149598 A1 generally requires the acquisition of a series of images as well as online evaluation of these images, for triggering a reading for the analyte determination. This acquisition of the series of images as well as the online evaluation is challenging in terms of time and resources. Further, the method generally is restricted to situations in which the second color component is independent of the analyte concentration itself and does not address the case in which the simple reading of the second color component may not be used as a timer for triggering the reading of the first color component and, thus, for triggering the determination of the value of the analyte characteristic. Further, triggering the reading of the first color component by the condition of the second color component having reached a specific value generally leads to a high uncertainty, specifically in case the slope of the curve of the second color component as a function of time is rather small. Thus, generally, triggering the measurement of the analyte concentration by the measurement of the second color component implies a plurality of technical challenges which remain to be solved.

Further, besides using customized detectors which are specifically developed for the purpose of optically detecting changes in the test chemistry comprised by corresponding test elements, recent developments aim at using widely available devices such as smartphones. However, when consumer-electronics devices having a camera, such as smartphones, are employed in order to determine analyte concentrations new challenges, in particular concerning the accuracy, arise.

Thus, with customized detectors, the point in time of sample application on the test strip is usually known. The knowledge of the point in time of sample application usually facilitates the determination of the appropriate point in time for measuring the analyte concentration. However, methods of determining concentration of an analyte in a bodily fluid based on using consumer-electronics devices having a camera, such as smartphones, usually do without such information or rely on user information of handling that may be faulty.

SUMMARY

This disclosure teaches methods and devices for determining a concentration of an analyte in a bodily fluid, which address the above-mentioned technical challenges of methods and devices using mobile devices such as consumer-electronics mobile devices, specifically multipurpose mobile devices which are not dedicated to analytical measurements, such as smartphones or tablet computers.

As used in the following, the terms "have," "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B," "A comprises B" and "A includes B" may both refer to a situation in which, besides B, no other element is present in A (i.e., a situation in which A solely and exclusively consists of B) and to a situation in which, besides B, one or more further elements are present in entity A, such as element C, elements C and D or even further elements.

Further, it shall be noted that the terms "at least one," "one or more" or similar expressions indicating that a feature or element may be present once or more than once typically will be used only once when introducing the respective feature or element. In the following, in most cases, when referring to the respective feature or element, the expressions "at least one" or "one or more" will not be repeated, non-withstanding the fact that the respective feature or element may be present once or more than once. It shall also be understood for purposes of this disclosure and appended claims that, regardless of whether the phrases "one or more" or "at least one" precede an element or feature appearing in this disclosure or claims, such element or feature shall not receive a singular interpretation unless it is made explicit herein. By way of non-limiting example, the terms "test field," "image," "camera," and "color channel," to name just a few, should be interpreted wherever they appear in this disclosure and claims to mean "at least one" or "one or more" regardless of whether they are introduced with the expressions "at least one" or "one or more." All other terms used herein should be similarly interpreted unless it is made explicit that a singular interpretation is intended.

Further, as used in the following, the terms "preferably," "more preferably," "particularly," "more particularly," "specifically," "more specifically" or similar terms are used in conjunction with optional features, without restricting alternative possibilities. Thus, features introduced by these terms are optional features and are not intended to restrict the scope of the claims in any way. The invention may, as the skilled person will recognize, be performed by using alternative features. Similarly, features introduced by "in an embodiment of the invention" or similar expressions are intended to be optional features, without any restriction regarding alternative embodiments of the invention, without any restrictions regarding the scope of the invention and without any restriction regarding the possibility of combining the features introduced in such way with other optional or non-optional features of the invention.

In a first aspect of this disclosure a method of determining a concentration of an analyte in a bodily fluid by using a mobile device having a camera is disclosed. The method comprises the following steps, which may specifically be performed in the given order. Still, a different order may also be possible. It may further be possible to perform two or more of the method steps fully or partially simultaneously. It may further be possible to perform one or more method steps or even all of the method steps once or repeatedly. The method may comprise additional method steps which are not listed herein. Generally, the method of determining a concentration of an analyte in a bodily fluid by using a mobile device having a camera comprises the following steps:

a) prompting a user to one or more of
   apply a drop of bodily fluid to at least one test field of an optical test strip, or
   confirm an application of a drop of bodily fluid to at least one test field of an optical test strip;
b) waiting for a predetermined minimum amount of waiting time;
c) capturing at least one image of at least one part of the test field, with the test field having the drop of bodily fluid applied thereto, by using the camera;
d) determining the concentration of the analyte in the bodily fluid based on the image captured in step c), comprising:
   i) estimating a point in time of sample application to the test field, by taking into account at least one first item of information derived from the image captured in step c) by using at least one first color channel of a color space, wherein the first item of information is time-dependent; and
   ii) estimating the concentration of the analyte in the bodily fluid, by taking into account at least one second item of information derived from the image by using at least one second color channel of the color space, wherein the second item of information is concentration-dependent.

The disclosed method of determining a concentration of an analyte in a bodily fluid by using a mobile device having a camera comprising the steps just described may also be referred to as the method of determining a concentration of an analyte in a bodily fluid.

The term "analyte" as used herein is a broad term and is to be given its ordinary and customary meaning to a person of ordinary skill in the art and is not to be limited to a special or customized meaning. The term specifically may refer, without limitation, to arbitrary chemical or biological substance or species, such as a molecule or a chemical compound, e.g., glucose, triglycerides, lactate or cholesterol.

The term "determining a concentration of an analyte," which may also be referred to as an analytical measurement, as used herein is a broad term and is to be given its ordinary and customary meaning to a person of ordinary skill in the art and is not to be limited to a special or customized meaning. The term may specifically refer, without limitation, to a qualitative and/or quantitative determination of at least one analyte in a sample. The result of the analytical measurement, as an example, may be the concentration of the analyte and/or the presence or absence of the analyte to be determined, e.g., blood, interstitial fluid, urine, saliva or the like.

The term "bodily fluid" as used herein is a broad term and is to be given its ordinary and customary meaning to a person of ordinary skill in the art and is not to be limited to a special or customized meaning. The term "body fluid" is used interchangeably with "bodily fluid" herein. The term may specifically refer, without limitation, to a liquid sample comprising at least one bodily fluid, such as blood, interstitial fluid, urine, saliva or the like.

The term "mobile device" as used herein is a broad term and is to be given its ordinary and customary meaning to a person of ordinary skill in the art and is not to be limited to a special or customized meaning. The term may specifically refer, without limitation, to a mobile electronics device, more specifically to a mobile communication device such as a cell phone or smartphone. Additionally or alternatively, as will be outlined in further detail below, the mobile device may also refer to a tablet computer or another type of portable computer having at least one camera.

The term "camera" as used herein is a broad term and is to be given its ordinary and customary meaning to a person of ordinary skill in the art and is not to be limited to a special or customized meaning. The term may specifically refer, without limitation, to a device configured for recording spatially resolved optical data, such as one or more images. The camera specifically may comprise one or more camera chips are imaging devices, such as one or more CCD and/or CMOS chips. The camera generally may comprise a one-dimensional or two-dimensional array of image sensors, such as pixels. As an example, the camera may comprise at least 10 pixels in at least one dimension, such as at least 10 pixels in each dimension. It shall be noted, however, that other cameras are also feasible. This disclosure specifically shall be applicable to cameras as usually used in mobile applications such as notebook computers, tablets or, specifically, cell phones such as smart phones. Thus, specifically, the camera may be part of a mobile device which, besides the at least one camera, comprises one or more data processing devices such as one or more data processors. Other cameras, however, are feasible. The camera, besides at least one camera chip or imaging chip, may comprise further elements, such as one or more optical elements, e.g., one or more lenses. As an example, the camera may be a fix-focus camera, having at least one lens which is fixedly adjusted with respect to the camera. Alternatively, however, the camera may also comprise one or more variable lenses which may be adjusted, automatically or manually.

The term "drop" as used herein is a broad term and is to be given its ordinary and customary meaning to a person of ordinary skill in the art and is not to be limited to a special or customized meaning. The term may specifically refer, without limitation, to an amount of liquid, such as the bodily fluid, such as a coherent amount of the bodily fluid. The term specifically may refer to a small amount or a small volume of liquid, such as a volume in the range of 0.5 microliter to several microliter. Thus, the drop may in particular be suited to wet or moisten the test field of the optical test strip such that a detection reaction may take place. The "drop of bodily fluid" may also be referred to as the "sample of bodily fluid" or simply as the "sample." Thus, the application of the drop of bodily fluid to the test field may also be referred to as the application of the sample or simply as the sample application.

The term "test field" is a broad term and is to be given its ordinary and customary meaning to a person of ordinary skill in the art and is not to be limited to a special or customized meaning. The term may specifically refer, without limitation, to a coherent amount of at least one test chemical, such as to an area, e.g., an area of round, polygonal or rectangular shape, having one or more layers of material, with at least one layer of the test field having the test chemical comprised therein. Other layers may be present in the test field, providing specific optical properties such as reflective properties, providing spreading properties for spreading the sample or providing separation properties such as for separating off particulate components of the sample, such as cellular components. The at least one image of the at least one part of the test field is captured in step c), wherein the test field has the drop of bodily fluid applied thereto. Thus, the at least one part of the test field specifically may have the drop of bodily fluid applied thereto. Specifically, the at least one part of the test field may be fully or at least partially be covered by the drop of bodily fluid. Thus, specifically, the at least one image of at least one part of the test field specifically may contain at least one part of the test field which contains at least part of the drop of the bodily fluid, such as at least one part of the test field wetted by the drop of the bodily fluid.

The test field is comprised by the optical test strip. The term "optical test strip" as used herein is a broad term and is to be given its ordinary and customary meaning to a person of ordinary skill in the art and is not to be limited to a special or customized meaning. The term may specifically refer, without limitation, to an arbitrary element or device configured for detecting the analyte or determining the concentration of the analyte in a liquid sample, such as in the drop of bodily fluid, specifically in the sense of the definition given above. The optical test strip, which may also be referred to as test strip or test element, as an example, may comprise at least one substrate, such as at least one carrier, with the at least one test field applied thereto or integrated therein. As an example, the at least one carrier may be strip-shaped. These test strips are generally widely in use and available. One test strip may carry a single test field or a plurality of test fields having identical or different test chemicals comprised therein. The optical test strip, in particular the test field comprising the test chemical, may specifically undergo a detection reaction, particularly a coloration reaction, in the presence of the at least one analyte, specifically a coloration reaction, wherein the color formation may be related, e.g., proportional to, the concentration of the analyte. Since the presence, the absence and/or the concentration of the analyte may be detectable by the detection reaction, the detection reaction may also be referred to as analyte detection reaction. Some basic principles on test elements and reagents that may also be used within the scope of this disclosure are described, e.g., in J. Hones et al.: Diabetes Technology and Therapeutics, Vol. 10, Supplement 1, 2008, pp. 10-26.

The term "predetermined minimum amount of waiting time" as used herein is a broad term and is to be given its ordinary and customary meaning to a person of ordinary skill in the art and is not to be limited to a special or customized meaning. The term specifically may refer, without limitation, to an amount of time that separates two actions or events. The term specifically may refer to a time span, which passes between steps a) and c), wherein the amount of time is predetermined. Specifically, the amount of time may be predetermined by storing a value for the amount of time in a volatile or non-volatile data storage of the mobile device, e.g., before performing step a), and by making use of this stored value when performing step b). The predetermined minimum amount of waiting time may be useful, necessary or required to allow termination or maturation of a process or action, such as the coloration reaction, that may have been started or induced at the beginning of the waiting time, e.g., by a specific action or an event, such as the application of the drop of bodily fluid. In particular, the waiting time may allow the coloration reaction to terminate, mature or reach a state, e.g., a steady state, suitable for deriving the analyte concentration in one or several further steps.

The term "image" as used herein is a broad term and is to be given its ordinary and customary meaning to a person of ordinary skill in the art and is not to be limited to a special or customized meaning. The term may specifically refer, without limitation, to data or information recorded by using the camera, such as a plurality of electronic readings from the imaging device, such as the pixels of the camera chip. Thus, as an example, the image may comprise a one-dimensional or two-dimensional array of data. The image itself, thus, may comprise pixels, the pixels of the image, as an example, correlating to pixels of the camera chip. Consequently, when referring to "pixels," reference is either made to the units of image information generated by the single pixels of the camera chip or to the single pixels of the camera chip directly.

The term "point in time" as used herein is a broad term and is to be given its ordinary and customary meaning to a person of ordinary skill in the art and is not to be limited to a special or customized meaning. The term specifically may refer, without limitation, to an absolute point in time, such as a point in time as defined or definable by the time of day, or to a time period or time span. Specifically, the point in time and the time span may be related or connected to one another, specifically convertible or transferable into one another, via at least one reference point in time. Thus, the time span may begin with the point in time and end with the reference point in time. In particular, the reference point in time may be the point in time when the at least one image is captured of the at least one part of the test field, with the test field having the drop of bodily fluid applied thereto and the point in time estimated in step i) may be the point in time of sample application to the test field or the time span between the sample application and the point in time when the image is captured.

The term "color space" as used herein is a broad term and is to be given its ordinary and customary meaning to a person of ordinary skill in the art and is not to be limited to a special or customized meaning. The term may specifically refer, without limitation, to an arbitrary coordinate system by which a color of an object, such as a color of a test field or a color of an image recorded by a camera, may be characterized, such as mathematically or physically. Various color coordinate systems are generally known to the skilled person, such as color coordinate systems defined by the CIE (Commission internationale de l'éclairage). Color coordinate systems other than those defined by the CIE are also feasible. The color coordinates, in their entirety, may span or define the color space, such as by defining three or four basis vectors. Thus, when the camera captures an image of an object, a value for each color coordinate is generated by the camera for each pixel. As an example, the camera chip may contain color sensors recording values for each color, such as triples like RGB (Red Green Blue) and L*a*b or quadruples like CMYK (cyan, magenta, yellow, key), wherein the values are dependent on the sensitivity of the camera chip. Without narrowing the scope, this disclosure will be specifically described with respect to the RGB color space. It shall be noted, however, that using other color spaces, such as those named above as well as further color spaces, is feasible.

The term "color channel" as used herein is a broad term and is to be given its ordinary and customary meaning to a person of ordinary skill in the art and is not to be limited to a special or customized meaning. The term may specifically refer, without limitation, to a specific color coordinate of a color space or to one or several values, e.g., numerical values, of a specific color coordinate, wherein the value was generated for a specific image in a specific color space. The value of the color coordinate may also be referred to as an intensity of the color channel. Generally, the image may be generated, represented or stored using a specific color space, e.g., the RGB color space, the La*b* color space, the CMYK color space or other color spaces. In case of using the RGB color space, for example, the color channel may be the red color coordinate, the green color coordinate or the blue color coordinate, which may also be referred to as the red color channel, the green color channel or the blue color channel. Additionally or alternatively, the color channel may be the value of the red color coordinate, the green color coordinate or the blue color coordinate, wherein the value may have been generated for at least one pixel of a specific image, particularly for one specific pixel or a plurality of pixels, such as a subset of the pixels of the image.

In particular, the first color channel and the second color channel may be different color channels of the same color space. Specifically, the first color channel may be or may comprise the blue color channel of the RGB color space. Furthermore, the second color channel may be or may comprise at least one of: the red color channel of the RGB color space and the green color channel of the RGB color space. One specific color channel, such as the blue color channel, may refer to color coordinates of different wavelength depending on the specific color space used. As an example, the blue color channel may represent light of a wavelength of 435.8 nm as may be commonly used in the CIE RGB color space, or it may represent light of a wavelength of 450 nm as may be commonly used in the Adobe-Wide-Gamut RGB color space, or of further wavelengths.

The term "item of information" as used herein is a broad term and is to be given its ordinary and customary meaning to a person of ordinary skill in the art and is not to be limited to a special or customized meaning. The term may specifically refer, without limitation, to an arbitrary item of information, e.g., one or more numerical values, which quantify at least one property, quality, feature or characteristic of an object, e.g., the image. Thus, the item of information may comprise information concerning one or several color channels of the color space used for the image and may thereby be derived from the image. Specifically, the item of information may comprise, may be based on or may be derived from one or several numerical values of one specific color channel, wherein the numerical values describe one or a plurality of pixels of the image, in particular when the image is represented or stored using a specific color space. These numerical values may by themselves be the item of information. Alternatively, the item of information may comprise further information, such as further numerical values. Specifically, the item of information may comprise a result of a calculation, wherein these numerical values and, optionally, further numerical values enter the calculation. The numerical values of the color channel pertaining to the image may for example be normalized using further numerical values of the same color channel pertaining to a further image. Thus, the item of information may be or may comprise a mean value or an average value of one specific color channel for the part of the test field having the drop of bodily fluid applied thereto. Said mean value or said average value may be set in relation to one or more further mean or average values of the same specific color channel for the same or one or more further parts of the optical test strip with or without having the drop of bodily fluid applied thereto.

The minimum amount of waiting time may be determined by using a method selected from the group consisting of:
  a time span is chosen for the minimum amount of waiting time, wherein the time span is known to be sufficient for a detection reaction in the test field for samples having a concentration of the analyte within a predetermined concentration range to have reached a steady state;
  a predetermined time span is chosen for the minimum amount of waiting time, specifically a time span of 1 s to 60 s, specifically 5 s to 40 s, more specifically 13 s to 30 s, most specifically 15 s to 25 s;
  a time span confirmed by the user in step a) is chosen for the minimum amount of waiting time.

The term "steady state" as used herein is a broad term and is to be given its ordinary and customary meaning to a person of ordinary skill in the art and is not to be limited to a special or customized meaning. The term may specifically refer, without limitation, to a state or condition in which at least one property characteristic of that state or condition remains constant or changes only in a marginal fashion at least within a specific time span. This property may in particular be the second item of information. Thus, the detection reaction may be classified as having reached a steady state, if at least one numerical value derived from the detection reaction, directly or indirectly, such as via one or more images of the test field with the sample applied, such as the second item of information, remains constant and/or changes only by a value of 5% or less, such as 0% to 5%, specifically 0% to 3%, more specifically 0% to 2%, e.g., within a time span of 0.5 s to 30 s, specifically 1 s to 15 s, more specifically 2 s to 5 s. The second item of information may be time-dependent, specifically regarding the time span elapsed since the application of the bodily fluid to the test field, wherein the time-dependency may decrease with the time. Thus, the second item of information may be independent of time and remain constant or change only in a marginal fashion when the detection reaction has reached a steady state. When the detection reaction has reached a steady state, the detection reaction may also be referred to as completed.

The first item of information is time-dependent, preferably essentially time-dependent, in particular regarding the time span elapsed since the application of the bodily fluid to the test field. Thus, as an example, the first item of information may change by at least 20% per second in at least one time interval of at least one second within the first 30 seconds after application of the bodily fluid. The first item of information is time-dependent and may continue to change with time when the detection reaction has reached a steady state. Thus, when the detection reaction has reached a steady state the first item of information may continue to change with time while the second item of information may assume a constant value, e.g., a plateau value, or may change only in a marginal fashion, specifically for analyte concentrations within a predetermined range of relevant analyte concentrations. The analyte may specifically be glucose. For a blood glucose measurement, the predetermined range of relevant analyte concentrations may specifically be 1 mg/dl to 1000 mg/dl, more specifically 5 mg/dl to 600 mg/dl, most specifically 25 mg/dl to 300 mg/dl. A temporal course of the first item of information and a temporal course of the second item of information may differ. Specifically, both the first item of information and the second item of information may change during a first period of the detection reaction during which the detection reaction has not yet reached a steady state. Thus, both the first and the second item of information may be time-dependent during the first period. A second period of the detection reaction may follow the first period, wherein the detection reaction may have reached a steady state during the second period. While the first item of information may continue to be time-dependent during the second period, the second item of information may be essentially independent of time during the second period.

The first item of information may furthermore be concentration-dependent regarding the analyte. The first item of information may specifically be or comprise the intensity of the first color channel. In particular, the first item of information may specifically be or comprise the intensity of the blue color channel.

The second item of information is concentration-dependent, preferably essentially concentration-dependent, specifically regarding the analyte concentration. The second item of information may furthermore be time-dependent, specifically regarding the time span elapsed since the application of the bodily fluid to the test field, wherein the time-dependency may decrease with the time. In particular, the time-dependency of the second item of information may decrease with time, such that after the detection reaction has been completed, the second item of information may be essentially independent of time. By contrast, the first item of information may be time-dependent beyond the completion of the detection reaction. The term "essentially independent of time" as used herein is a broad term and is to be given its ordinary and customary meaning to a person of ordinary skill in the art and is not to be limited to a special or customized meaning. The term may specifically refer, without limitation, to a quantity, an item or a value that may be constant or almost constant at least within a specific time span or from a specific point in time onward, e.g., within a specific time-span starting with the completion of the detection reaction or from the completion of the detection reaction onward. Thus the quantity, the item or the value may be constant and/or it may change only by a value of 5% or less, e.g., 0% to 5%, specifically by a value of 3% or less, e.g., 0% to 3%, more specifically by a value of 2% or less, e.g., 0% to 2%, at least within the specific time span or from the specific point in time onward. The specific time-span, within which the quantity, the item or the value, particularly the second item of information, may be essentially independent of time, may in particular be a time-span of 10 sec to 60 min, specifically 20 sec to 30 min, more specifically 30 sec to 10 min.

Thus, the first item of information is time-dependent, wherein the first item of information may be time-dependent beyond the completion of the analyte detection reaction. Further, the second item of information may be time-dependent, wherein the time-dependency may decrease with time, such that after the completion of the analyte detection reaction the second item of information may be essentially independent of time.

The second item of information may specifically be or comprise the intensity of the second color channel. In particular, the second item of information may be or comprise the intensity of at least one of: the red color channel; the green color channel.

The estimated analyte concentration in step ii) may be determined by determining, specifically computing, the concentration of the analyte corresponding to the second item of information by means of a correlation between the analyte concentration and the second item of information and by using an assumed time span elapsed since the application of the bodily fluid to the test field. In particular, the correlation may be, may comprise or may be represented or representable by a curve, a function, a relationship and/or a lookup table. The curve, the function, the relationship and/or the lookup table may be predetermined or determinable. The assumed time span elapsed since the application may be selected from the group consisting of: a predetermined time span, specifically a predetermined time span of 10 s to 40 s, more specifically of 15 s to 30 s, more specifically of 20 s; the minimum amount of waiting time; a time span to be specified by the user. The estimating of the concentration of the analyte in the bodily fluid in step ii) may further take into account the point in time of sample application estimated in step i) and, optionally, the predetermined minimum amount of waiting time.

The method of determining a concentration of an analyte in a bodily fluid may further comprise step e):
 e) a refining step, comprising one or both of:
  assessing a plausibility of the estimated analyte concentration determined in step ii) by means of the first item of information;
  improving an accuracy of the estimated analyte concentration determined in step ii) by means of the first item of information.

The refining step may, in particular, be performed in an iterative manner, e.g., with one, two, three or more iterations, e.g., with at least one iteration. The second item of information may be time-dependent. Further, in step ii), the concentration of the analyte in the bodily fluid may be estimated by using the assumed time span elapsed since the application of the bodily fluid to the test field. The first item of information, in addition to being time-dependent, may additionally be dependent on the analyte concentration. In step e), the dependency of the first item of information on the concentration may be eliminated by assuming the concentration of the analyte in the bodily fluid estimated in step ii). Thereby, by making use of the first item of information and, optionally, other information, a probable time span elapsed since the application of the bodily fluid to the test field may be derived. Further, the probable time span elapsed since the application of the bodily fluid to the test field may be compared with the assumed time span elapsed since the application of the bodily fluid to the test field.

Further, the probable time span elapsed since the application of the bodily fluid to the test field may be compared with the assumed time span elapsed since the application of the bodily fluid to the test field.

The concentration of the analyte in the bodily fluid may further be re-estimated by performing step ii) and by using the probable time span as the assumed time span in step ii). The re-estimating may in particular be performed iteratively.

Step e) may specifically comprise applying a correction to the estimated analyte concentration. Thus, as an example, the refining step e) may comprise correcting the estimated analyte concentration determined in step ii).

The correction may specifically comprise one or both of applying a correction factor to the estimated analyte concentration and applying an offset to the estimated analyte concentration. Thus, as an example, the estimated analyte concentration may be corrected by using a mathematical operation on the estimated analyte concentration, such as by one or more of multiplying, dividing, adding and subtracting the estimated analyte concentration, e.g., with a corresponding number and/or value. The correction factor and/or the offset, such as the number and/or value of the correction factor and/or the offset, may specifically be predefined and/or predetermined.

Specifically, the correction may take into account the assumed time span, such as the assumed time span elapsed since the application of the bodily fluid to the test field. In particular, the correction applied to the estimated analyte concentration may be time dependent, e.g., by taking into account the assumed time span. As an example, the correction factor and/or the offset applied to the estimated analyte concentration may be time dependent.

The correction to the estimated analyte concentration may be a function of a time variable. In particular, the time variable may characterize the time span elapsed between the application of the drop of bodily fluid to the test field and the capturing of the image of the test field with the test field having the drop of bodily fluid applied thereto. The term "time variable" as used herein is a broad term and is to be given its ordinary and customary meaning to a person of ordinary skill in the art and is not to be limited to a special or customized meaning. The term specifically may refer, without limitation, to an arbitrary parameter configured for indicating a progression of time, e.g., indicating an advance and/or an elapse of time. Thus, the term "function of a time variable" as used herein, may specifically refer, without limitation, to an arbitrary operation depending on at least the time variable.

As an example, the time variable may be selected from the group consisting of: a probable time span elapsed since the application of the bodily fluid to the test field from the first item of information, the probable time span being determined by using the first item of information on the concentration; a difference between the assumed time span and a probable time span elapsed since the application of the bodily fluid to the test field from the first item of information, the probable time span being determined by using the first item of information on the concentration; the point in time of sample application to the test field as estimated in step i).

The correction to the estimated analyte concentration may further take into account one or both of the concentration of the analyte in the bodily fluid as estimated in step ii) and the first item of information. Thus, at least one of the first item of information derived from the image captured in step c) and the concentration of the analyte estimated in step ii) may be taken into account when correcting the estimated analyte concentration.

The correction may specifically be or may comprise one of:
    a continuous function of the time variable;
    a step function of the time variable, the step function having a first constant value for at least one first range of the time variable and having at least one second constant value for at least a second range of the time variable; and
    a function defined differently in at least two different sections of the time variable.

The correction may be or may comprise a continuous function of the time variable, such as a continuous time dependent function. Thus, the estimated analyte concentration may be corrected by applying a continuous function of the time variable to the estimated analyte concentration.

The correction may be or may comprise a step function of the time variable. Thus, the estimated analyte concentration may be corrected by applying a step function having a first constant value for at least one first range of the time variable and having at least one second constant value for at least a second range of the time variable. In particular, the estimated analyte concentration may be corrected by, in a first range, e.g., in a first time span, applying a first constant value to the concentration and, in a second range, e.g., in a second time span for example different from the first time span, applying a second constant value to the concentration. Thus, as an example, in a first range of the time variable, such as in the first time span, the first constant value may be used for correcting the estimated analyte concentration, wherein in a second range of the time variable, such as in the second time span, the second constant value may be used for correcting the estimated analyte concentration.

The correction may be or may comprise a function defined differently in at least two different sections of the time variable. Thus, the estimated analyte concentration may be corrected by applying a function defined differently in at least two different sections of the time variable, such as a function defined differently in at least one first range of the time variable, e.g., in a first time span, and in at least one second range of the time variable, e.g., in a second time span. As an example, for correcting the estimated analyte concentration, in a first range of the time variable, such as in the first time span, a first function may be applied to the estimated analyte concentration and in a second range of the time variable, such as in the second time span, a second function may be applied to the estimated analyte concentration, wherein the first function differs from the second function.

As an example, applying the correction to the estimated analyte concentration may specifically be beneficial for high and/or dynamic measurement errors. As an example, the correction of the estimated analyte concentration may be applied in case the time span elapsed t may be one or more of: t<12 s, specifically 5 s<t<12 s.

Step e) may further comprise at least one of the following options:
    α) selecting at least one correlation from a predetermined set of correlations, wherein each correlation describes a relationship between the first item of information and the analyte concentration for a specific time span elapsed since the application of the bodily fluid to the test field;
    β) selecting at least one correlation from a predetermined set of correlations, wherein each correlation describes a relationship between the first item of information and the time elapsed since the application of the bodily fluid to the test field for a specific analyte concentration.

In particular, the correlation may be, may comprise or may be represented or representable by a curve, e.g., a straight line, a function, a relationship and/or a lookup table. The curve, the function, the relationship and/or the lookup table may be predetermined or determinable. Particularly, in step e) option α) may be chosen and the correlation may be selected according to the assumed time span elapsed since the application. Furthermore, additionally or alternatively option β) may be chosen in step e) and the correlation may be selected from the set of correlations according to the estimated analyte concentration determined in step ii).

Step e) may further comprise determining an expected first item of information corresponding to the estimated analyte concentration determined in step ii), specifically corresponding to the estimated analyte concentration determined by means of the correlation selected in step e). In particular, the expected first item of information may be determined, specifically calculated, from the correlation selected in step e) by using the estimated analyte concentration determined in step ii) and the assumed time span. Attention may be drawn to the differences between the first item of information derived from the image by using the first color channel and the expected first item of information which may be determined by using the estimated analyte concentration determined in step ii) and the assumed time span. Since the estimated analyte concentration takes into account the second item of information, the expected first item of information may take into the second item of information and may be independent of the first item of information.

From a comparison of the first item of information derived from the image by using the first color channel with the expected first item of information at least one conclusion may be drawn on the accuracy of the assumed time span and/or on the estimated analyte concentration determined in step ii). In particular, step e) may comprise comparing the expected first item of information to the first item of information derived in step i) from the image captured in step c). In particular, the comparing may comprise forming a difference between the expected first item of information and the first item of information derived in step i) from the image captured in step c). The estimated analyte concentration determined in step d) may be classified as plausible if a difference between the expected first item of information and the first item of information derived in step i) is equal to or smaller than a predetermined threshold value, wherein the estimated analyte concentration determined in step d) is classified as implausible if the difference between the computed value of the first item of information and the first item of information of the image captured in step c) is greater than the predetermined threshold value. In particular the threshold value may have a value from 0.5 s to 20 s, specifically 1 s to 10 s, more specifically 1 s to 5 s. Further, in case that the estimated analyte concentration is classified as implausible, a further estimated analyte concentration may be determined using a probable time span elapsed since the application of the bodily fluid to the test field. In particular, the probable time span may be chosen to be greater than the assumed time span if the expected first item of information is smaller than the first item of information derived in step ii), wherein the probable time span is chosen to be smaller than the assumed time span if the expected first item of information is greater than the first item of information derived in step ii). The difference between the probable time span and the assumed time span may be chosen to be proportional to the difference between the expected first item of information and the first item of information derived in step ii) from the image captured in step c).

Furthermore, the method may be repeated in an iterative manner, e.g., with at least one iteration, in particular the accuracy of the estimated analyte concentration determined in step ii) may be improve, until the estimated analyte concentration is classified as plausible.

The method may further comprise capturing at least one dry image of the at least one part of the test field, with the test field not having the drop of bodily fluid applied thereto, by using the camera. Furthermore, step d) may comprise deriving at least one item of reference information from at least one reference part of the optical test strip outside the test field. In particular, the reference part may be devoid of any sample. Further, the item of reference information may be derived with or without the test field having the drop of bodily fluid applied thereto. Specifically, one or both of steps i) or ii) may be performed by taking into account one or both of: at least one item of dry information derived from the dry image; the at least one reference information.

Thus, the second item of information may specifically comprise a quotient comprising a numerator and a denominator, wherein the numerator may comprise the intensity of the second color channel of the image of the test field having the drop of bodily fluid applied thereto and wherein the denominator may comprise at least one element selected from the group consisting of: the item of dry information, specifically the intensity of the second color channel of the dry image of the at least one part of the test field without the bodily fluid applied thereto; the reference information, specifically the intensity of the second color channel of the image of at least one reference part of the optical test strip outside the test field. Particularly, the image with the test field having the drop of bodily fluid applied thereto and the dry image may be captured with a time lag but under similar, specifically identical, conditions. In particular, the same test strip may be imaged several times, e.g., twice, in different states, e.g., with and without bodily fluid applied thereto. Alternatively, at least two different optical test strips may be used. As a further alternative, the dry image and the image with the test field having the drop of bodily fluid applied thereto may be captured simultaneously, e.g., in one image, by using two different test strips.

Furthermore, the reference information, specifically the intensity of the second color channel of the image of at least one reference part of the optical test strip outside the test field, may be acquired simultaneously with the image with the test field having the drop of bodily fluid applied thereto or in a subsequent fashion. In both cases either the same or two different optical test strips may be used.

Thus, the second item of information may be or may comprise a first quotient comprising a first numerator and a first denominator, as well as a second quotient comprising a second numerator and a second denominator, wherein the first quotient may be divided by the second quotient. In particular, each numerator and each denominator may comprise a mean or an average value of the same specific color channel, e.g., the red color channel. The mean or average values may represent or be derived from different areas of the same image and/or regarding the same areas of different images, which may be taken at different points in time, such as before sample application and after the predetermined minimum amount of waiting time. Specifically the first numerator may comprise said mean or average value of the image of the part of the test field with the having the drop of bodily fluid applied thereto, said image being captured in step c). The first denominator may comprise said mean or average value of the image of the reference part, wherein the image is acquired after the predetermined minimum amount of waiting time, e.g., as part of the image captured in step c). The second numerator may comprise the mean or average value of the dry image of the at least one part of the test field, with the test field not having the drop of bodily fluid applied thereto. Herein, the part of the dry test field and the part of the test field with the sample applied may be the same or may be different. The second denominator may comprise the mean or average value of the image of the reference part, wherein the image is acquired before the sample is applied to the test field, e.g., as part of the dry image.

Additionally or alternatively, the second item of information may be or may comprise only one quotient. The numerator and the denominator may comprise a mean or an average value of the same specific color channel, e.g., the red color channel, wherein the mean or average values may represent or be derived from the same area of one particular test strip, pictured at different points in time, such as before sample application and after the predetermined minimum amount of waiting time. Alternatively, the mean or average values may represent or be derived from the same area of at least two different test strips, pictured simultaneously or at different points in time, one with and the other without sample applied. Particularly, the numerator may comprise the mean or average value of the image of the part of the test field having the drop of bodily fluid applied thereto and the denominator may comprise the mean or average value of the image of the part of the test field without having the drop of bodily fluid applied thereto.

Furthermore, in step c) at least two images may be captured. Specifically, the capturing of the at least two images may take place within a predetermined timeframe. The predetermined timeframe may, in particular, have a maximum duration of 0.5 s to 20 s, specifically of 1 s to 10 s, more specifically of 1 s to 5 s, more specifically of 2 s or less. Specifically, the first items of information of the at least two images may be different. Further, the second items of information of the at least two images may be similar or identical. In particular, the method may comprise step f), wherein step f) may particularly be carried out between step c) and step d):

f) comparing the second items of information of the at least two images.

In particular, step d) may be carried out if the second items of information of the at least two images are essentially identical, specifically if a difference between the second items of information may be smaller than a predetermined threshold value, wherein the method is aborted if the second items of information of the at least two images are different, specifically if the difference is equal to or above the predetermined threshold value. Further, the first items of information of the at least two images may also be compared, e.g., in step f) or in a further step.

In a further aspect of this disclosure, a mobile device having a camera is disclosed, the mobile device being configured for determining a concentration of an analyte in a bodily fluid by using the following steps, which may specifically be performed in the given order. Still, a different order may also be possible. It may further be possible to perform two or more of the steps fully or partially simultaneously. It may further be possible to perform one or more steps or even all of the method steps once or repeatedly. Further, the mobile device may be configured to perform additional steps, which are not listed herein. Generally, the steps are as follows:

A) prompting a user to one or more of:
 apply a drop of bodily fluid to at least one test field of an optical test strip, or
 confirm an application of a drop of bodily fluid to at least one test field of an optical test strip;
B) prompting the user to wait for a predetermined minimum amount of waiting time;
C) capturing at least one image of at least one part of the test field, with the test field having the drop of bodily fluid applied thereto, by using the camera;
D) determining the concentration of the analyte in the bodily fluid based on the image captured in step c), comprising:
 I. estimating a point in time of sample application to the test field by taking into account at least one first item of information derived from the image captured in step c) by using at least one first color channel of a color space, wherein the first item of information is time-dependent; and
 II. estimating the concentration of the analyte in the bodily fluid, by taking into account at least one second item of information derived from the image by using at least one second color channel of the color space, wherein the second item of information is concentration-dependent.

Regarding possible terms and definitions, reference may again be made to the disclosure of the method of determining a concentration of an analyte in a bodily fluid as given above or as given further below. The mobile device may in particular be configured for determining a concentration of an analyte in a bodily fluid by using the method of determining a concentration of an analyte in a bodily fluid as given above. In particular, the first item of information may be preferably essentially time-dependent, specifically regarding the time span elapsed since the application of the bodily fluid to the test field. Further, the second item of information may be preferably essentially concentration dependent regarding the analyte concentration.

In a further aspect of this disclosure, a kit for determining a concentration of an analyte in a bodily fluid, is disclosed, the kit comprising:
 at least one mobile device having at least one camera, wherein the mobile device is configured for determining a concentration of an analyte in a bodily fluid; and
 at least one optical test strip having at least one test field.

In particular, the mobile device may be or may comprise a mobile device as described above. For possible definitions and embodiments reference may again be made to the description of the method of determining the concentration of the analyte as well as to the computer program including computer-executable instructions for performing the method of determining a concentration of an analyte in a bodily fluid as described above or as described further below.

The term "kit" as used herein is a broad term and is to be given its ordinary and customary meaning to a person of ordinary skill in the art and is not to be limited to a special or customized meaning. The term may specifically refer, without limitation, to an assembly of a plurality of components, wherein each component may function and may be handled independently, wherein the components of the kit may interact to perform a common function.

In a further aspect of this disclosure, a computer program, specifically a smart phone app, including computer-executable instructions for performing the method of determining a concentration of an analyte in a bodily fluid using the camera is disclosed. The computer program is configured for performing the method of determining a concentration of an analyte as described above or as further described below, when the program is executed on a computer or computer network, specifically on a processor of a mobile device having at least one camera. Thus, specifically regarding possible definitions and embodiments, reference may be made to the description of the method of determining a concentration of the analyte as disclosed above or as further disclosed below. The computer program including computer-executable instructions for performing the method of determining a concentration of an analyte in a bodily fluid may specifically be configured for performing one or more, specifically all, of the method steps a) to d) disclosed above, which may specifically be performed in the given order. Still, a different order may also be possible. It may further be possible to perform two or more of the method steps fully or partially simultaneously. It may further be possible to perform one or more method steps or even all of the method steps once or repeatedly. The method may comprise additional method steps which are not listed herein.

Further disclosed and proposed herein is a computer program including computer-executable instructions for performing the method according to this disclosure in one or more of the embodiments enclosed herein when the program is executed on a computer or computer network. Specifically, the computer program may be stored on a computer-readable data carrier. Thus, specifically, one, more than one or even all of method steps a) to d) as indicated above, as well as optionally step e) and/or f), may be performed by using a computer or a computer network, preferably by using a computer program.

Further disclosed and proposed herein is a computer program product having program code means, in order to perform the method according to this disclosure in one or more of the embodiments enclosed herein when the program is executed on a computer or computer network. Specifically, the program code means may be stored on a computer-readable data carrier.

Further disclosed and proposed herein is a data carrier having a data structure stored thereon, which, after loading into a computer or computer network, such as into a working memory or main memory of the computer or computer network, may execute the method according to one or more of the embodiments disclosed herein.

Further disclosed and proposed herein is a computer program product with program code means stored on a machine-readable carrier, in order to perform the method according to one or more of the embodiments disclosed herein, when the program is executed on a computer or computer network. As used herein, a computer program product refers to the program as a tradable product. The product may generally exist in an arbitrary format, such as in a paper format, or on a computer-readable data carrier. Specifically, the computer program product may be distributed over a data network.

Finally, disclosed and proposed herein is a modulated data signal which contains instructions readable by a computer system or computer network, for performing the method according to one or more of the embodiments disclosed herein.

Referring to the computer-implemented aspects of this disclosure, one or more of the method steps or even all of the method steps of the method according to one or more of the embodiments disclosed herein may be performed by using a computer or computer network. Thus, generally, any of the method steps including provision and/or manipulation of data may be performed by using a computer or computer network. Generally, these method steps may include any of the method steps, typically except for method steps requiring manual work, such as providing the samples and/or certain aspects of performing the actual measurements.

Specifically, further disclosed herein are:
- a computer or computer network comprising at least one processor, wherein the processor is adapted to perform the method according to one of the embodiments described in this description,
- a computer loadable data structure that is adapted to perform the method according to one of the embodiments described in this description while the data structure is being executed on a computer,
- a computer program, wherein the computer program is adapted to perform the method according to one of the embodiments described in this description while the program is being executed on a computer,
- a computer program comprising program means for performing the method according to one of the embodiments described in this description while the computer program is being executed on a computer or on a computer network,
- a computer program comprising program means according to the preceding embodiment, wherein the program means are stored on a storage medium readable to a computer,
- a storage medium, wherein a data structure is stored on the storage medium and wherein the data structure is adapted to perform the method according to one of the embodiments described in this description after having been loaded into a main and/or working storage of a computer or of a computer network, and
- a computer program product having program code means, wherein the program code means can be stored or are stored on a storage medium, for performing the method according to one of the embodiments described in this description, if the program code means are executed on a computer or on a computer network.

The method of determining the concentration of the analyte in a bodily fluid, the computer program and the kit disclosed herein provide numerous advantages over methods, computer programs and kits of similar kind known in the art.

In particular, the method and devices of this disclosure may provide for an accurate and fail-safe implementation of a method of determining the concentration of the analyte in a bodily fluid, specifically a photo app analyte measurement, because the most relevant points in time, such as the sample application to the test field and/or the point in time when the color formation reaction may reach a steady state, specifically the end point of the color formation reaction, may be appropriately estimated or determined. Thus, an accuracy of the determined analyte concentration may be increased compared to methods and devices known in the art.

Specifically, the method and devices of this disclosure may address the above-mentioned challenges of known methods and devices of similar kind. Thus, as an example, in the method as presently proposed, the minimum amount of waiting time is predetermined. Thereby, as an example, a triggering of the analyte measurement by using a sequence of images and information derived from the sequence of images may be avoided. Thus, the method may be implemented without the need for large resources. Further, uncertainties of triggering one measurement by using other measurements may be avoided, thereby possibly increasing the measurement accuracy. Still, e.g., by using the above described iterative procedure, the point in time of sample application may be determined in a rather efficient and accurate manner, e.g., by using just one image or only a few images. Further, the method may be implemented without using customized devices, such as by using the users' own mobile devices, e.g., standard smart phones or tablet computers.

Specifically, the method as presently proposed may estimate the concentration of the analyte in the bodily fluid, by taking into account the at least one second item of information without an indication based on the first item of information of an appropriate time for such an estimation of the analyte concentration. Thus, the analyte concentration may be estimated by taking into account the second item of information derived from the image, while the image may be captured at any point in time that is in accordance with the method, e.g., after the predetermined minimum amount of waiting time. Said point in time, which may within the above-indicated limits be essentially freely chosen, may then be characterized, particularly in relation to the point in time of sample application, by taking into account the first item of information. Thus, the presently proposed method may furthermore be advantageous in its flexibility, practicability and ease of use.

Summarizing and without excluding further possible embodiments, the following embodiments may be envisaged:

Embodiment 1: A method of determining a concentration of an analyte in a bodily fluid by using a mobile device having a camera, the method comprising:
- a) prompting a user to one or more of
  - apply a drop of bodily fluid to at least one test field of an optical test strip, or
  - confirm an application of a drop of bodily fluid to at least one test field of an optical test strip;
- b) waiting for a predetermined minimum amount of waiting time;
- c) capturing at least one image of at least one part of the test field, with the test field having the drop of bodily fluid applied thereto, by using the camera;
- d) determining the concentration of the analyte in the bodily fluid based on the image captured in step c), comprising:
  - i) estimating a point in time of sample application to the test field, by taking into account at least one first item of information derived from the image captured in step c) by using at least one first color channel of a color space, wherein the first item of information is time-dependent; and
  - ii) estimating the concentration of the analyte in the bodily fluid, by taking into account at least one second item of information derived from the image by using at least one second color channel of the color space, wherein the second item of information is concentration-dependent.

Embodiment 2: The method according to the preceding embodiment, wherein the minimum amount of waiting time is determined by using a method selected from the group consisting of:
- a time span is chosen for the minimum amount of waiting time, wherein the time span is known to be sufficient for a detection reaction in the test field for samples having a concentration of the analyte within a predetermined concentration range to have reached a steady state;
- a predetermined time span is chosen for the minimum amount of waiting time, specifically a time span of 1 s to 40 s, specifically 2 s to 20 s, more specifically 5 s;
- a time span confirmed by the user in step a) is chosen for the minimum amount of waiting time.

Embodiment 3: The method according to any one of the preceding embodiments, wherein the first item of information is furthermore concentration-dependent regarding the analyte.

Embodiment 4: The method according to any one of the preceding embodiments, wherein the second item of information is furthermore time-dependent, wherein the time-dependency decreases with the time.

Embodiment 5: The method according to any one of the preceding embodiments, wherein, the estimating of the concentration of the analyte in the bodily fluid in step ii) further takes into account the point in time of sample application estimated in step i) and optionally the predetermined minimum amount of waiting time.

Embodiment 6: The method according to any one of the preceding embodiments, wherein the estimated analyte concentration in step ii) is determined by determining, specifically computing, the concentration of the analyte corresponding to the second item of information by means of a correlation between the analyte concentration and the second item of information and by using an assumed time span elapsed since the application of the bodily fluid to the test field.

Embodiment 7: The method according to the preceding embodiment, wherein the assumed time span elapsed since the application is selected from the group consisting of: a predetermined time span, specifically a predetermined time span of 10 s to 40 s, more specifically of 15 s to 30 s, more specifically of 20 s; the minimum amount of waiting time; a time span to be specified by the user.

Embodiment 8: The method according to the preceding embodiment, the method further comprising step e):
- e) a refining step, comprising one or both of assessing a plausibility of the estimated analyte concentration determined in step ii) by means of the first item of information, or improving an accuracy of the estimated analyte concentration determined in step ii) by means of the first item of information.

Embodiment 9: The method according to the preceding embodiment, wherein the refining step is performed in an iterative manner, specifically with at least one iteration.

Embodiment 10: The method according to any one of the two preceding embodiments, wherein the second item of information is time-dependent.

Embodiment 11: The method according to any one of the three preceding embodiment, wherein, in step ii), the concentration of the analyte in the bodily fluid is estimated by using an assumed time span elapsed since the application of the bodily fluid to the test field.

Embodiment 12: The method according to the preceding embodiment, wherein the first item of information, in addition to being time-dependent, additionally is dependent on the analyte concentration.

Embodiment 13: The method according to the preceding embodiment, wherein, in step e), the dependency of the first item of information on the concentration is eliminated by assuming the concentration of the analyte in the bodily fluid estimated in step ii), thereby deriving a probable time span elapsed since the application of the bodily fluid to the test field from the first item of information.

Embodiment 14: The method according to the preceding embodiment, wherein the probable time span elapsed since the application of the bodily fluid to the test field is compared with the assumed time span elapsed since the application of the bodily fluid to the test field.

Embodiment 15: The method according to any one of the two preceding embodiments, wherein the concentration of the analyte in the bodily fluid is re-estimated by performing step ii) and by using the probable time span as the assumed time span in step ii).

Embodiment 16: The method according to the preceding embodiment, wherein the re-estimating is performed iteratively.

Embodiment 17: The method according to any one of the nine preceding embodiments, wherein step e) comprises applying a correction to the estimated analyte concentration.

Embodiment 18: The method according to the preceding embodiment, wherein the correction comprises one or both of applying a correction factor to the estimated analyte concentration and applying an offset to the estimated analyte concentration.

Embodiment 19: The method according to any one of the two preceding embodiments, wherein the correction takes into account the assumed time span.

Embodiment 20: The method according to any one of the three preceding embodiments, wherein the correction to the estimated analyte concentration is a function of a time variable, the time variable characterizing the time span elapsed between the application of the drop of bodily fluid to the test field and the capturing of the image of the test field with the test field having the drop of bodily fluid applied thereto.

Embodiment 21: The method according to the preceding embodiment, wherein the time variable is selected from the group consisting of: a probable time span elapsed since the application of the bodily fluid to the test field from the first item of information, the probable time span being determined by using the first item of information on the concentration, specifically the probable time span determined in embodiment 13; a difference between the assumed time span and a probable time span elapsed since the application of the bodily fluid to the test field from the first item of information, the probable time span being determined by using the first item of information on the concentration, specifically the probable time span determined in embodiment 13; the point in time of sample application to the test field as estimated in step i).

Embodiment 22: The method according to any one of the two preceding embodiments, wherein the correction to the estimated analyte concentration further takes into account one or both of the concentration of the analyte in the bodily fluid as estimated in step ii) and the first item of information.

Embodiment 23: The method according to any one of the three preceding embodiments, wherein the correction is one of:
- a continuous function of the time variable;
- a step function of the time variable, the step function having a first constant value for at least one first range of the time variable and having at least one second constant value for at least a second range of the time variable; and
- a function defined differently in at least two different sections of the time variable.

Embodiment 24: The method according to any one of the sixteen preceding embodiments, wherein step e) comprises at least one of the following options:
- α) selecting at least one correlation from a predetermined set of correlations, wherein each correlation describes a relationship between the first item of information and the analyte concentration for a specific time span elapsed since the application of the bodily fluid to the test field;
- β) selecting at least one correlation from a predetermined set of correlations, wherein each correlation describes a relationship between the first item of information and the time elapsed since the application of the bodily fluid to the test field for a specific analyte concentration.

Embodiment 25: The method according to the preceding embodiment, wherein step e) further comprises determining an expected first item of information corresponding to the estimated analyte concentration determined in step ii) by means of the correlation selected in step e).

Embodiment 26: The method according to the preceding embodiment, wherein step e) further comprises comparing the determined expected first item of information with the first item of information derived from the image captured in step c).

Embodiment 27: The method according to the preceding embodiment, wherein the estimated analyte concentration determined in step d) is classified as plausible if a difference between the expected first item of information and the first item of information derived in step i) from the image captured in step c) is equal to or smaller than a predetermined threshold value, wherein the estimated analyte concentration determined in step d) is classified as implausible if the difference between the expected first item of information and the first item of information derived in step i) is greater than the predetermined threshold value.

Embodiment 28: The method according to the preceding embodiment, wherein, in case that the estimated analyte concentration is classified as implausible, a further estimated analyte concentration is determined using the probable time span elapsed since the application of the bodily fluid to the test field.

Embodiment 29: The method according to the preceding embodiment, wherein the probable time span is chosen to be greater than the assumed time span if the expected first item of information is smaller than the first item of information derived in step ii), wherein the probable time span is chosen to be smaller than the assumed time span if the expected first item of information is greater than the first item of information derived in step ii).

Embodiment 30: The method according to the preceding embodiment, wherein a difference between the probable time span and the assumed time span is chosen to be proportional to the difference between the expected first item of information and the first item of information derived in step ii).

Embodiment 31: The method according to the any of the four preceding embodiment, wherein the method is repeated in an iterative manner, e.g., with at least one iteration, until the estimated analyte concentration is classified as plausible.

Embodiment 32: The method according to any one of the preceding embodiments, wherein the first color channel comprises a blue color channel.

Embodiment 33: The method according to any one of the preceding embodiments, wherein the first item of information comprises an intensity of the first color channel.

Embodiment 34: The method according to any one of the preceding embodiments, wherein the second color channel comprises at least one element selected from the group consisting of: a red color channel; a green color channel.

Embodiment 35: The method according to any one of the preceding embodiments, wherein the second item of information comprises an intensity of the second color channel.

Embodiment 36: The method according to any one of the preceding embodiments, wherein the method further comprises capturing at least one dry image of the at least one part of the test field, with the test field not having the drop of bodily fluid applied thereto, by using the camera.

Embodiment 37: The method according to any one of the preceding embodiments, wherein step d) further comprises deriving at least one reference information from at least one reference part of the optical test strip outside the test field.

Embodiment 38: The method according to any one of the two preceding embodiments, wherein one or both of steps i) or ii) are performed by taking into account one or both of: at least one item of dry information derived from the dry image; the at least one reference information.

Embodiment 39: The method according to any one of the preceding embodiments, wherein in step c) at least two images are captured.

Embodiment 40: The method according to the preceding embodiment, wherein the capturing of the at least two images takes place within a predetermined timeframe.

Embodiment 41: The method according to the preceding embodiment, wherein the predetermined timeframe has a maximum duration of 0.5 s to 20 s, specifically of 1 s to 10 s, more specifically of 1 s to 5 s, more specifically of 2 s or less.

Embodiment 42: The method of any one of the three preceding embodiments, wherein the method further comprises step f), wherein step f) is carried out between step c) and step d):

f) comparing the second items of information of the at least two images.

Embodiment 43: The method of any of the four preceding embodiments, wherein step d) is carried out if the second items of information of the at least two images are essentially identical, wherein the method is aborted if the second items of information of the at least two images are different.

Embodiment 44: The method of any one of the five preceding embodiments, wherein the first items of information of the at least two images differ.

Embodiment 45: A computer program including computer-executable instructions for performing the method according to any one of the preceding embodiments when the program is executed on a computer or computer network.

Embodiment 46: A mobile device having a camera, the mobile device being configured for determining a concentration of an analyte in a bodily fluid by using the following steps:
  A) prompting a user to one or more of:
    apply a drop of bodily fluid to at least one test field of an optical test strip, or
    confirm an application of a drop of bodily fluid to at least one test field of an optical test strip;
  B) prompting the user to wait for a predetermined minimum amount of waiting time;
  C) capturing at least one image of at least one part of the test field, with the test field having the drop of bodily fluid applied thereto, by using the camera;
  D) determining the concentration of the analyte in the bodily fluid based on the image captured in step c), comprising:
    I. estimating a point in time of sample application to the test field by taking into account at least one first item of information derived from the image captured in step c) by using at least one first color channel of a color space, wherein the first item of information is time-dependent; and
    II. estimating the concentration of the analyte in the bodily fluid, by taking into account at least one second item of information derived from the image by using at least one second color channel of the color space, wherein the second item of information is concentration-dependent.

Embodiment 47: A kit for determining a concentration of an analyte in a bodily fluid, the kit comprising:
  at least one mobile device according to any one of the preceding embodiments referring to a mobile device; and
  at least one optical test strip having at least one test field.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein:

FIGS. 3A and 3B show correlations between an intensity of a blue color channel and the glucose concentration (FIG. 3A) and between the intensity of the blue color channel and a time span elapsed since sample application (FIG. 3B);

FIG. 6 shows the first item of information derived from the image in step i) and the expected first item of information in one diagram;

FIG. 7 shows the glucose concentration determined using a probable time span;

DESCRIPTION

The embodiments described below are not intended to be exhaustive or to limit the invention to the precise forms disclosed in the following detailed description. Rather, the embodiments are chosen and described so that others skilled in the art may appreciate and understand the principles and practices of this disclosure.

Figure 1:
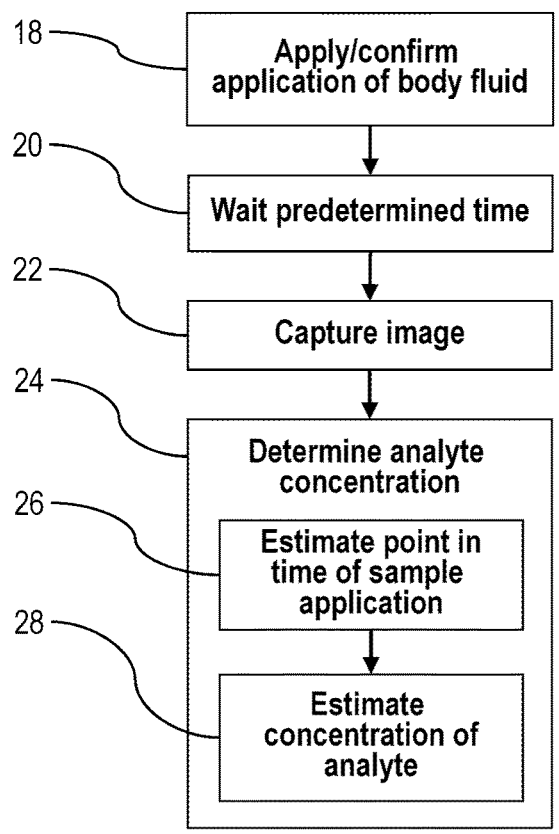
FIG. 1 shows a flow chart of a method of determining a concentration of an analyte in a bodily fluid.

In a first aspect of this disclosure, a method of determining a concentration of an analyte in a bodily fluid by using a mobile device 110 having a camera 112 is disclosed. FIG. 1 shows a flow chart of the method of determining a concentration of an analyte in a bodily fluid by using a mobile device 110 having a camera 112. The method comprises the following steps, which may specifically be performed in the given order. Still, a different order may also be possible. It may further be possible to perform two or more of the method steps fully or partially simultaneously. It may further be possible to perform one or more method steps or even all of the method steps once or repeatedly. The method may comprise additional method steps which are not listed herein. The method steps are the following:
  a) prompting a user to one or more of
    apply a drop of bodily fluid to at least one test field 114 of an optical test strip 116, or
    confirm an application of a drop of bodily fluid to at least one test field 114 of an optical test strip 116;
  b) waiting for a predetermined minimum amount of waiting time;
  c) capturing at least one image of at least one part of the test field 114, with the test field 114 having the drop of bodily fluid applied thereto, by using the camera 112;
  d) determining the concentration of the analyte in the bodily fluid based on the image captured in step c), comprising:
    i) estimating a point in time of sample application to the test field 114, by taking into account at least one first item of information derived from the image captured in step c) by using at least one first color channel of a color space, wherein the first item of information is time-dependent; and
    ii) estimating the concentration of the analyte in the bodily fluid, by taking into account at least one second item of information derived from the image by using at least one second color channel of the color space, wherein the second item of information is concentration-dependent.

In FIG. 1 method step a) is represented by reference number 18, method step b) is represented by reference number 20, method step c) is represented by method step 22, method step d) is represented by reference number 24 with substep i), which may also simply be referred to as i), being represented by reference number 26 and substep ii), which may also be referred to as ii), being represented by reference number 28.

As described above, the analyte may, in particular, be glucose. An embodiment of the method of determining the concentration of the analyte will in the following be illustrated in an exemplary fashion with glucose as the analyte. It shall be noted, however, that other embodiments of the method, in particular other analytes, are possible.

Figure 2:
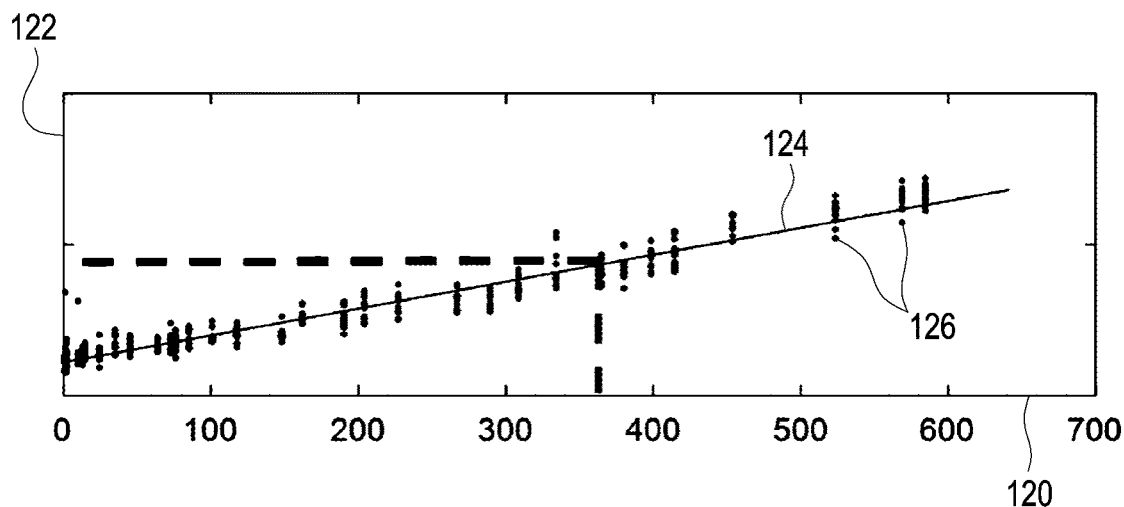
FIG. 2 shows a correlation between an intensity of a red color channel and a glucose concentration.

FIG. 2 shows the determination of the estimated the glucose concentration in the bodily fluid by taking into account the at least one second item of information derived from the image by using at least one second color channel of the color space. The second item of information may specifically be or comprise the intensity of the second color channel. The second color channel may in particular be or comprise the red color channel of the color space used for capturing, representing or storing the image captured in step c). In the embodiment described in the following the second item of information will, by way of example, comprise the intensity of the red color channel. The second item of information, specifically the intensity of the red color channel, is concentration dependent. The second item of information may furthermore be time dependent regarding the time span elapsed since the application of the drop of bodily fluid to the test field. Thus, an assumed time span, e.g., a time span of 20 s, may be taken into account together with the second item of information, e.g., the intensity of the red color channel, to determine the estimated glucose concentration. FIG. 2 illustrates a correlation between the intensity of the red color channel and the glucose concentration. The x-axis shows the glucose concentration in mg/dl, marked with reference sign 120. The y-axis shows intensity of the red color channel in arbitrary units, marked with reference sign 122, at the time point of 20 s after the sample application to the test field 114. A curve 124 fitted using measured intensities of the red color channel corresponding to different, known glucose concentrations is displayed, the measuring points 126 being marked by dots. Thus, using the intensity of the red color channel derived from the image captured in step c) and the assumed time span of 20 s the glucose concentration may be estimated.

The method of determining a concentration of the analyte, specifically glucose, in a bodily fluid may further comprise step e):

e) a refining step, comprising one or both of:
  assessing a plausibility of the estimated analyte concentration determined in step ii) by means of the first item of information;
  improving an accuracy of the estimated analyte concentration determined in step ii) by means of the first item of information.

The first item of information may in particular be or comprise the intensity of the blue color channel of the color space used for capturing, representing or storing the image captured in step c). The first item of information, in particular the intensity of the blue color channel, is time dependent. The first item of information may furthermore be concentration dependent regarding the analyte concentration. In the embodiment described in the following the first item of information will, by way of example, comprise the intensity of the blue color channel.

Step e) may further comprise at least one of the following options:
  α) selecting at least one correlation from a predetermined set of correlations, wherein each correlation describes a relationship between the first item of information and the analyte concentration for a specific time span elapsed since the application of the bodily fluid to the test field;
  β) selecting at least one correlation from a predetermined set of correlations, wherein each correlation describes a relationship between the first item of information and the time elapsed since the application of the bodily fluid to the test field for a specific analyte concentration.

FIGS. 3A and 3B each shows a set of curves, each set of curves representing a predetermined set of correlations. The curves in FIG. 3A illustrate the correlation between the intensity of the blue color channel and the glucose concentration with each curve corresponding to a specific point in time after sample application. The x-axis shows the glucose concentration in mg/dl, marked with reference sign 120. The y-axis shows intensity of the blue color channel in arbitrary units, marked with reference sign 128. Each curve corresponds to a specific point in time after sample application. Curves 130, 132, 134, 136, 138, 140 and 142 correspond to elapsed time spans of 5 s, 11 s, 17 s, 20 s, 23 s, 29 s and 35 s since sample application, respectively. The curves 130, 132, 134, 136, 138, 140 and 142 are fitted using measured intensities of the blue color channel corresponding to different, known glucose concentrations, the measuring points 126 being marked by dots.

Each curve displayed in FIG. 3A may in particular be describable using the following type of equation, wherein the parameters $p_1$ and $p_2$ may have to be determined for each curve, wherein x stands for the glucose concentration in mg/dl and y stands for the intensity of the blue color channel in arbitrary units:

$$y = p_1 * x + p_2 \quad (1)$$

A dependency of the parameters $p_1$ and $p_2$ from the time span t elapsed since the sample application may be describable using the following equation:

$$p_i(t) = A_{1,i} + A_{2,i} * t + A_{3,i} * t^{1/2} \quad (2)$$

Figure 4:
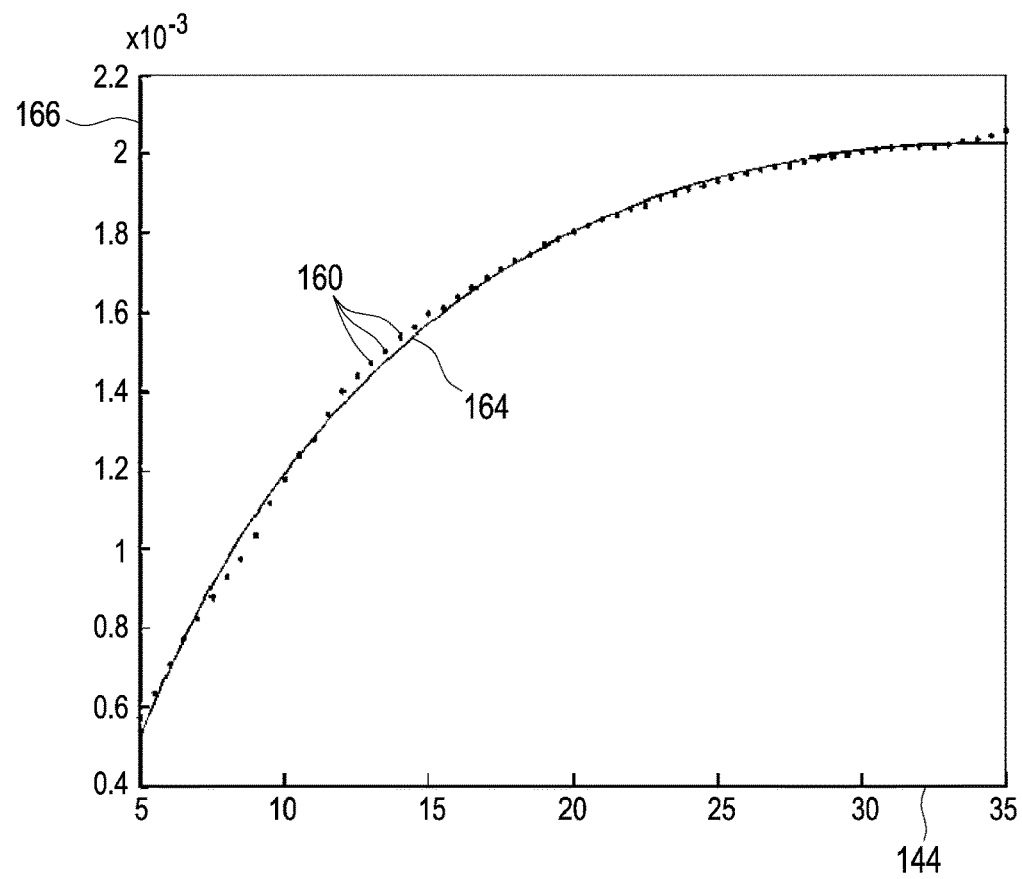
FIGS. 4A and 4B show parameters $p_1$ and $p_2$ as a function of the time elapsed since sample application.
Figure 4:
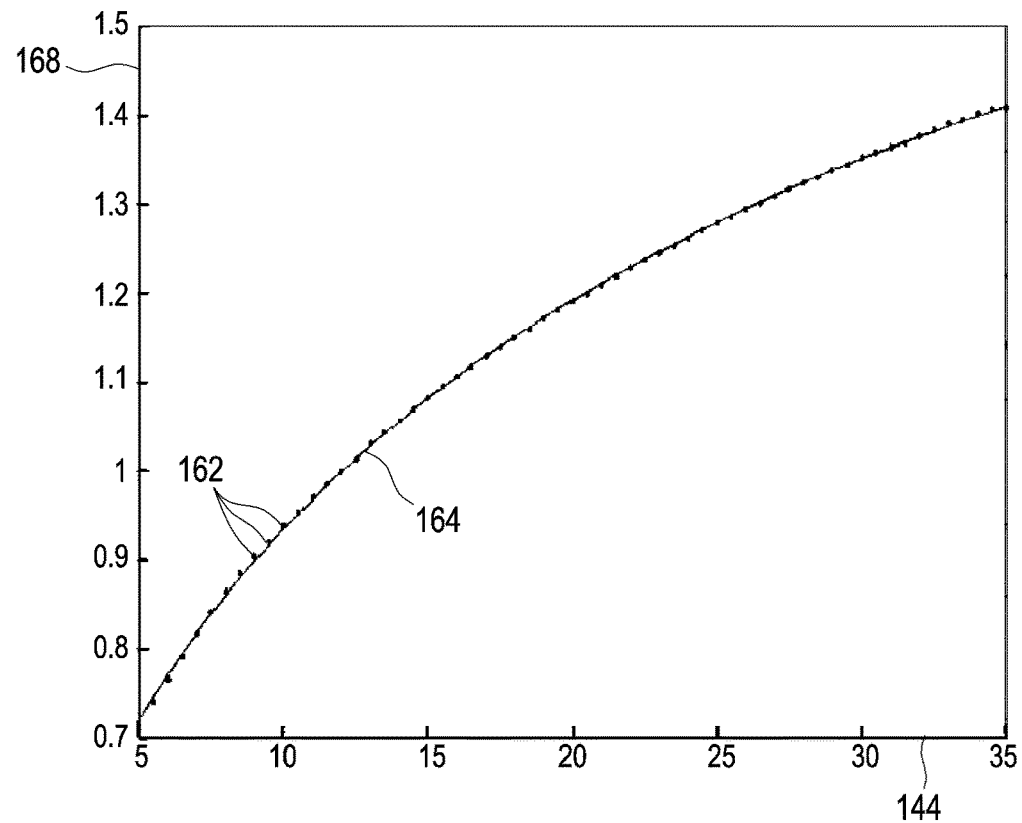

FIGS. 4A and 4B show typical values for $p_1$ (FIG. 4A) and for $p_2$ (FIG. 4B) marked by reference numbers 160 and 162, respectively. Further, FIGS. 4A and 4B show fit curves 164 for $p_1$ and $p_2$, respectively, based on the equation (2). Thus, the x-axis for both FIGS. 4A and 4B represent the time span elapsed since the sample application and are marked by reference number 144. The y-axis of FIG. 4A represents $p_1$ and the y-axis in FIG. 4B represents $p_2$. In FIG. 4A the parameter $p_1$ is represented in units of dl/mg. In FIG. 4B the parameter $p_2$ is represented in a unitless fashion.

The curves in FIG. 3B illustrate the correlation between the intensity of the blue color channel and the time span elapsed since the sample application with each curve corresponding to a specific glucose concentration. The x-axis shows the time span elapsed since the sample application in seconds, marked with reference sign 144. The y-axis shows intensity of the blue color channel in arbitrary units, marked with reference sign 128. Each curve corresponds to a specific glucose concentration. Curves 146, 168, 150, 152, 154, 156 and 158 correspond to glucose concentrations of 15 mg/dl, 50 mg/dl, 90 mg/dl, 185 mg/dl, 310 mg/dl, 435 mg/dl and 650 mg/dl, respectively.

Figure 5:
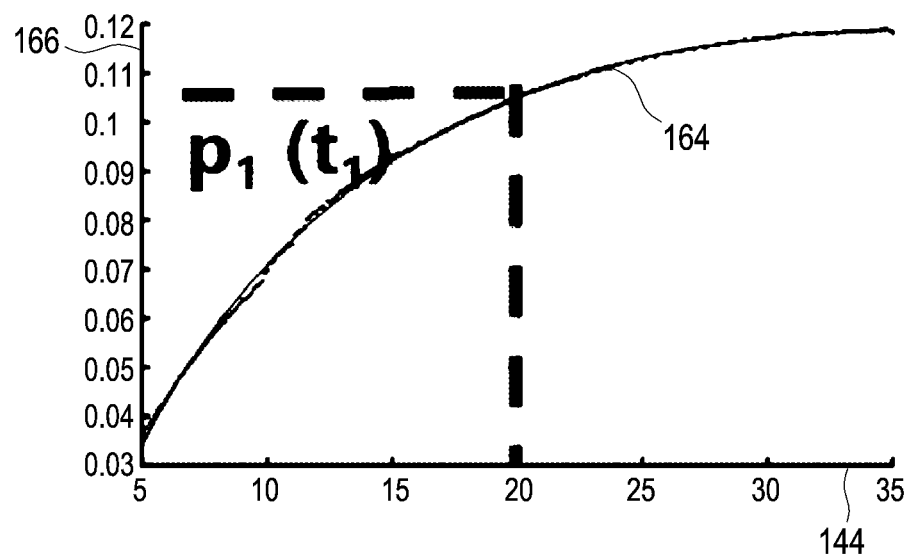
FIGS. 5A and 5B show a determination of the parameters $p_1$ and $p_2$ for a specific time span elapsed since sample application.
Figure 5:
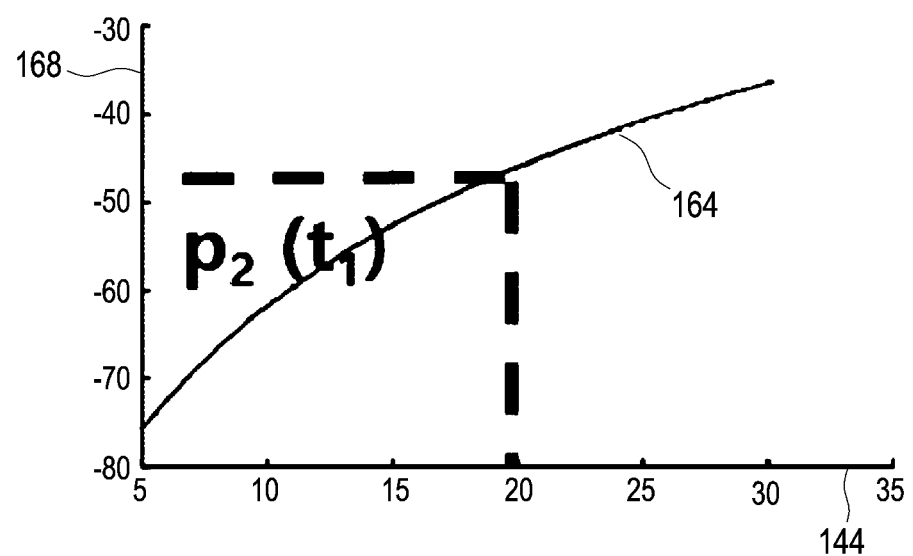

Particularly, in step e) option a) may be chosen, and the correlation may be selected from the ones shown in FIG. 3A according to the assumed time span elapsed since the application, which may, e.g., be 20 s as described above. Step e) may further comprise determining an expected first item of information, such as an expected intensity of the blue color channel, wherein the expected intensity of the blue color channel may correspond to the estimated glucose concentration determined, for instance by using the correlation as displayed in FIG. 2. As shown in FIGS. 5A and 5B, in order to determine the expected intensity of the blue color channel, the parameters $p_1$ and $p_2$ may be determined for the assumed time span, particularly $t_1$, e.g., by using the fit curves. Inserting the determined parameters $p_1$ and $p_2$ into equation (1) may then yield the expected intensity of the blue color channel. The expected intensity of the blue color channel may be similar or identical to the intensity of the blue color channel derived from the image taken in step c) if the assumed time span is similar or identical to the time span actually elapsed since the sample application. Thus, from a comparison of the intensity of the blue color channel derived from the image by using the first color channel with the expected intensity of the blue color channel at least one conclusion may be drawn on the accuracy of the assumed time span and/or on the estimated analyte concentration determined in step ii).

Thus, step e) may comprise comparing the expected first item of information to the first item of information derived in step i) from the image captured in step c). In particular, the comparing may comprise forming a difference between the expected first item of information and the first item of information derived in step i) from the image captured in step c). The estimated analyte concentration determined in step d) may be classified as plausible if a difference between the expected first item of information and the first item of information derived in step i) is equal to or smaller than a predetermined threshold value, wherein the estimated analyte concentration determined in step d) is classified as implausible if the difference between the computed value of the first item of information and the first item of information of the image captured in step c) is greater than the predetermined threshold value. In particular the threshold value may have a value from 0.5 s to 20 s, specifically 1 s to 10 s, more specifically 1 s to 5 s. Further, in case that the estimated analyte concentration is classified as implausible, a further estimated analyte concentration may be determined using a probable time span elapsed since the application of the bodily fluid to the test field. In particular, the probable time span may be chosen to be greater than the assumed time span if the expected first item of information is smaller than the first item of information derived in step ii), wherein the probable time span is chosen to be smaller than the assumed time span if the expected first item of information is greater than the first item of information derived in step ii). The difference between the probable time span and the assumed time span may be chosen to be proportional to the difference between the expected first item of information and the first item of information derived in step ii) from the image captured in step c).

FIG. 6 illustrates that the first item of information derived from the image in step i), e.g., the intensity of the blue color channel derived from the image, depicted here as $B_0$, and the expected first item of information, e.g., the expected intensity of the blue color channel, depicted here as $B(t_1)$, may differ. As described above, a probable time span may be derived from the assumed time span taking into account the comparison of the intensity of the blue color channel derived from the image, depicted as $B_0$ and the expected intensity of the blue color channel. Thus, the probable time span may, e.g., be 23 s and an estimated glucose concentration of improved accuracy may be determined by using the probable time span as illustrated in FIG. 7. For determining the more accurate glucose concentration the curve corresponding to the probable time span elapsed may be used as also shown in FIG. 7. In FIG. 7, the glucose concentration of improved accuracy is marked as $BG_2$.

Furthermore, the method may be repeated at least once in an iterative manner, in particular the accuracy of the estimated analyte concentration determined in step ii) may be improve, until the estimated analyte concentration is classified as plausible.

In a further aspect of this disclosure, a mobile device 110 having a camera 112 is disclosed, the mobile device 110 being configured for determining a concentration of an analyte in a bodily fluid by using the following steps, which may specifically be performed in the given order. Still, a different order may also be possible. It may further be possible to perform two or more of the steps fully or partially simultaneously. It may further be possible to perform one or more steps or even all of the method steps once or repeatedly. Further, the mobile device may be configured to perform additional steps, which are not listed herein. Generally, the steps are as follows:

A) prompting a user to one or more of:
    apply a drop of bodily fluid to at least one test field 114 of an optical test strip 116, or
    confirm an application of a drop of bodily fluid to at least one test field 114 of an optical test strip 116;

B) prompting the user to wait for a predetermined minimum amount of waiting time;

C) capturing at least one image of at least one part of the test field 114, with the test field 114 having the drop of bodily fluid applied thereto, by using the camera 112;

D) determining the concentration of the analyte in the bodily fluid based on the image captured in step c), comprising:
    I. estimating a point in time of sample application to the test field 114 by taking into account at least one first item of information derived from the image captured in step c) by using at least one first color channel of a color space, wherein the first item of information is time-dependent; and
    II. estimating the concentration of the analyte in the bodily fluid, by taking into account at least one second item of information derived from the image by using at least one second color channel of the color space, wherein the second item of information is concentration-dependent.

In a further aspect of this disclosure, a kit 172 for determining a concentration of an analyte in a bodily fluid, is disclosed, the kit 172 comprising:
    at least one mobile device 110 having at least one camera 112, wherein the mobile device 110 is configured for determining a concentration of an analyte in a bodily fluid; and
    at least one optical test strip 116 having at least one test field 114.

Figure 8:
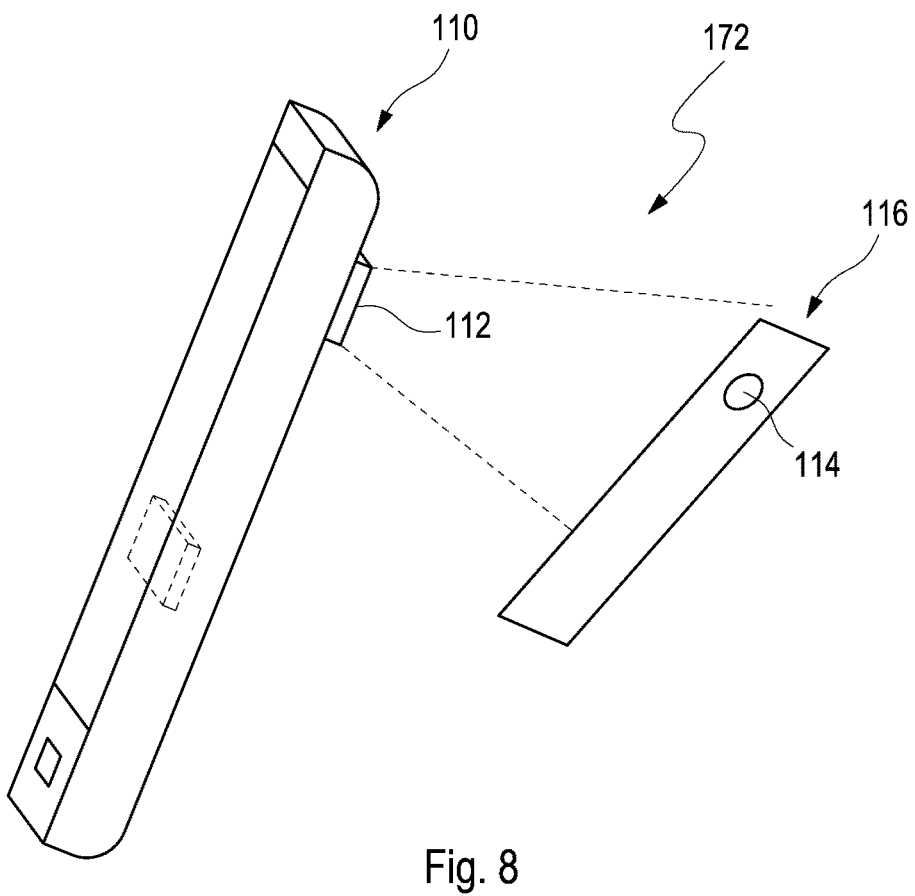
FIG. 8 shows a kit for determining the concentration of an analyte in a bodily fluid, the kit comprising at least one mobile device having a camera and an optical test strip having at least one test field.

In particular, the mobile device 110 may be or may comprise a mobile device 110 as described above. FIG. 8 shows the mobile device 110 having the camera 112, the optical test strip 116 and the test field 114.

Figure 9:
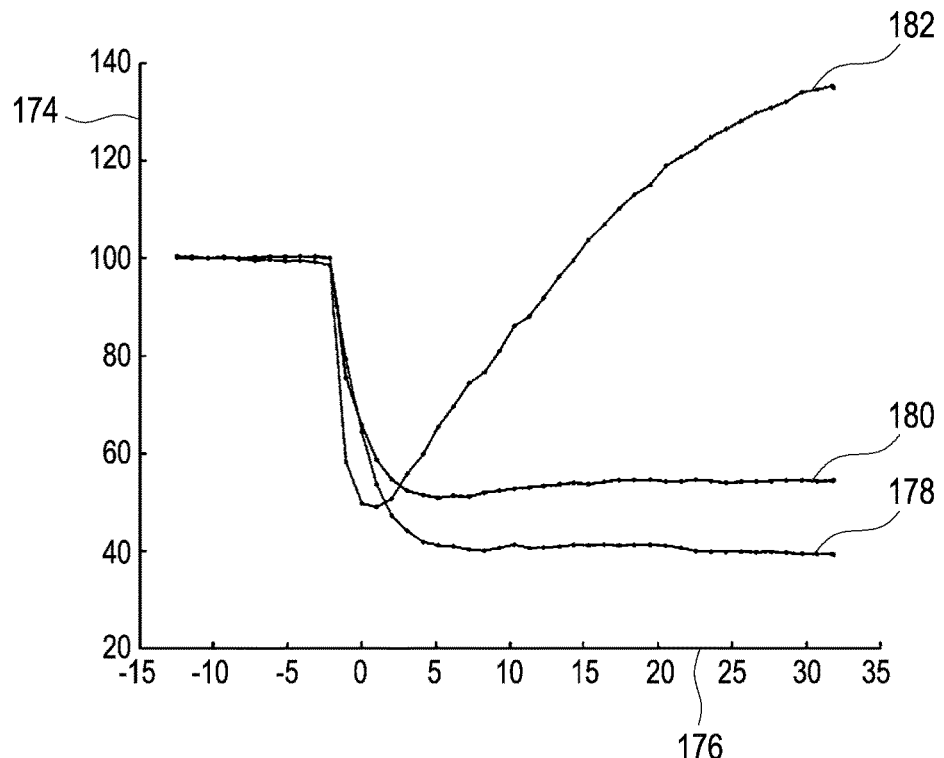
FIG. 9 shows a temporal course of the intensity of the red color channel, the green color channel and the blue color channel during a detection reaction.

FIG. 9 shows an exemplary temporal course of the intensity of the red color channel 178, the green color channel 180 and the blue color channel 182 during a detection reaction with glucose as an analyte, the glucose concentration in this example being 530 mg/dl. The intensity of the red color channel 174, the green color channel 174 and the blue color channel 174 is shown in arbitrary units on the y-axis. The x-axis shows the time 176 in seconds. The detection reaction starts with the application of the drop of bodily fluid comprising the analyte to the test field, which results in a sudden drop of the intensities of all three color channels 178, 180 and 182 distinguishable in FIG. 9 at the point in time of about −2 seconds. As can be seen in FIG. 9, both the intensity of the red color channel 178 and the intensity of the green color channel 180 may first show a time-dependent behavior with rapidly changing intensity values. The time-dependency may then decrease with completion of the detection reaction, which in FIG. 9 coincides roughly with the point in time marked with 5 seconds. In particular, the intensities of both the red 178 and the green color channel 180 may be almost constant and may change only in a marginal fashion from the point in time marked by 5 seconds onward. The intensity of the red color channel and/or the intensity of the green color channel may serve as the second item of information. The temporal course, in particular the time-dependency, of the intensity of the blue color channel 182 differs in FIG. 9 from the temporal course, in particular the time-dependency, of the intensities of the red 178 and the green color channel 180. As shown in FIG. 9 the intensity of the blue color channel 182 may continue to be time-dependent when the detection reaction has reached a steady state, which in FIG. 9 coincides roughly with the point in time marked by 5 seconds. In particular, the intensity of the blue color channel 182 may continue to change from the point in time marked by 5 seconds onward. The intensity of the blue color channel may serve as the first item of information.

Figure 10:
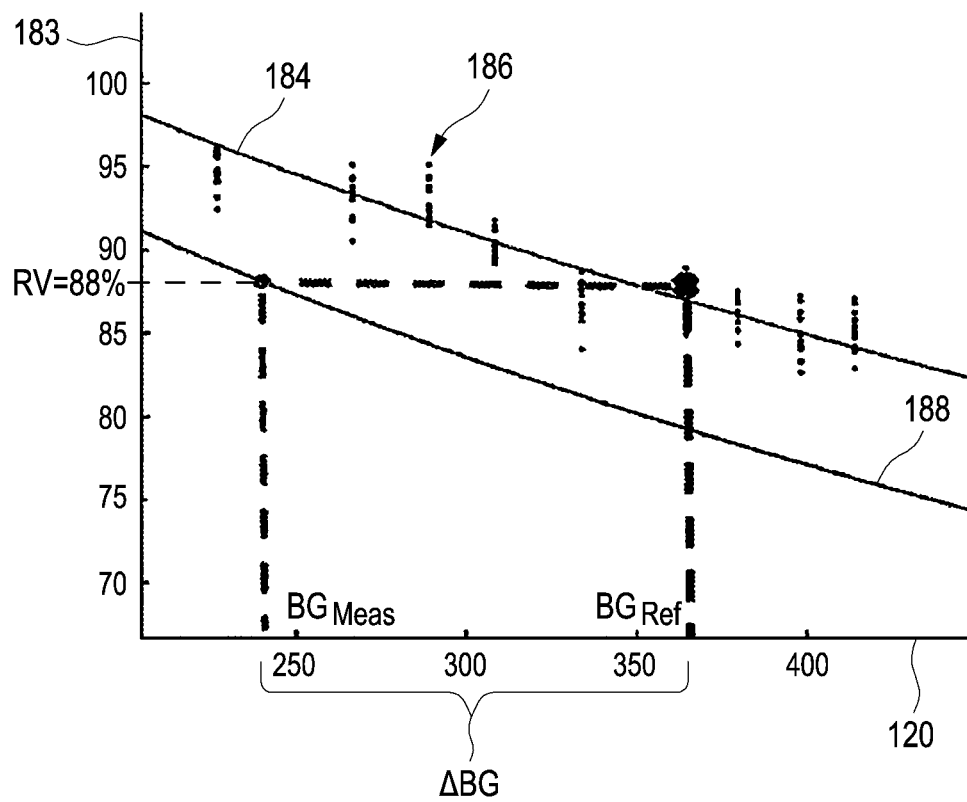
FIG. 10 shows a determination of a correction to be applied to an estimated analyte concentration for a specific time span elapsed.

In FIG. 10, a determination of a correction to be applied to an estimated analyte concentration for a specific time span elapsed is illustrated. The x-axis shows a glucose concentration in mg/dl, marked with reference sign 120. The y-axis shows a remission value in %, marked with reference sign 183, e.g., determined by evaluating the intensity of the red color channel. Specifically, the correlation between the intensity of the red color channel and the glucose concentration is illustrated, with each curve corresponding to a specific time span elapsed since the sample application. In particular, curve 184 corresponds to an elapsed time span of 5 s since sample application, wherein the curve 184 may estimate measuring points of the elapsed time span of 5 s since sample application, the measuring points being marked with reference sign 186. Curve 188 corresponds to the assumed time span elapsed since the application, which may, e.g., be 20 s as described above. Thus, the correction to be applied to the estimated analyte concentration for a specific time span elapsed, such as a deviation ΔBG, e.g., an offset, may be determined as illustrated in FIG. 10. Specifically, as an example, when the assumed time span elapsed, e.g., curve 188, is used for determining the blood glucose concentration, for a remission value of RV=88%, the resulting blood glucose concentration may be $BG_{Meas}$=240 mg/dl. However, in case the time span actually elapsed since the sample application, e.g., the actual time span elapsed, differs from the assumed time span elapsed, such as in the example illustrated in FIG. 10, wherein the actual time span elapsed equals 5 s, the resulting blood glucose concentration should be $BG_{Ref}$=365 mg/dl. Thus, the deviation ΔBG may be used for correcting the result, e.g., the estimated blood glucose concentration $BG_{Meas}$. Specifically, the estimated analyte concentration may be corrected by applying a correction, e.g., the deviation ΔBG, to the estimated analyte concentration. Typical courses for such deviations are illustrated in FIG. 11.

Figure 11:
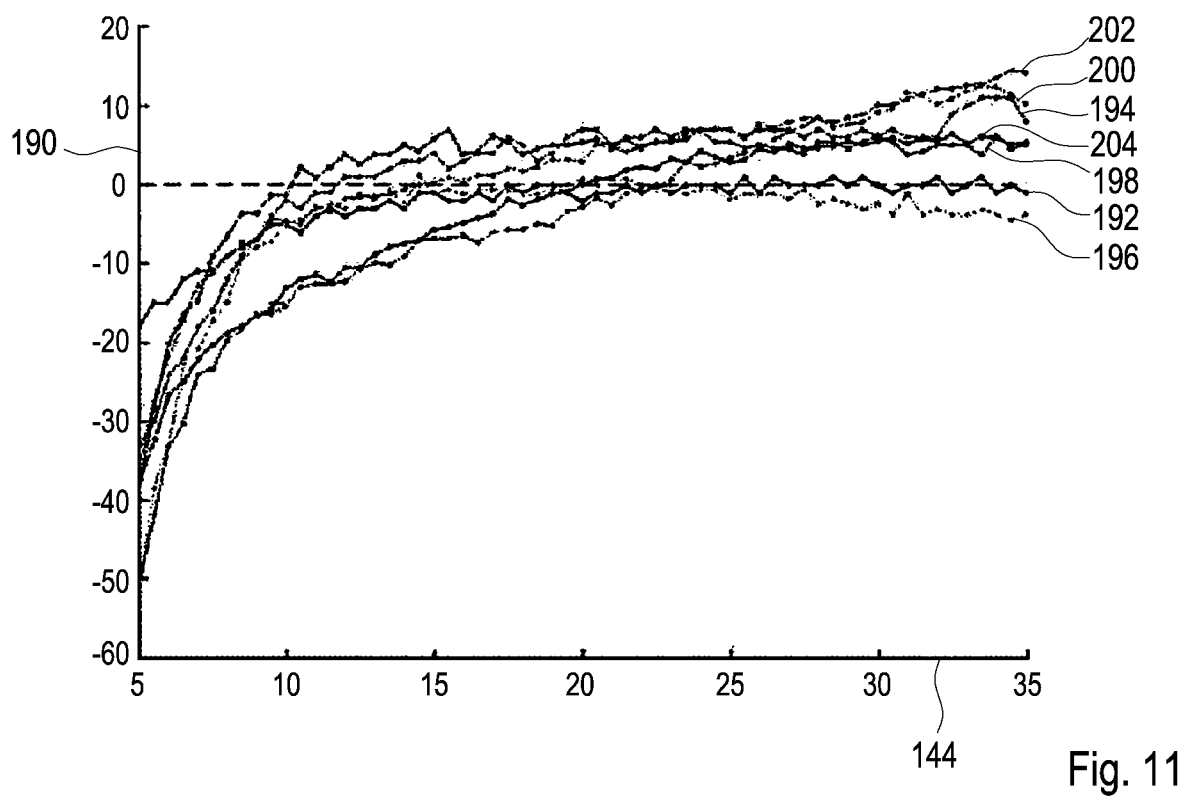
FIG. 11 shows correction functions for different glucose concentrations.

Specifically, the curves in FIG. 11 illustrate correction functions for different glucose concentrations. The x-axis shows the time span elapsed since the sample application in seconds, marked with reference sign 144. The y-axis shows a deviation of glucose concentration in mg/dl, marked with reference sign 190. Each curve corresponds to a specific glucose concentration. Curves 192, 194, 196, 198, 200, 202 and 204 correspond to glucose concentrations of 45 mg/dl, 76 mg/dl, 162 mg/dl, 227 mg/dl, 334 mg/dl, 414 mg/dl and 585 mg/dl, respectively.

For determining the illustrated courses, as an example, multiple deviations for various time spans elapsed may be determined experimentally. In detail, for specific time spans elapsed the deviation ΔBG may be determined by using the following equation:

$$\Delta BG = (BG\text{Meas} - BG\text{Ref})/BG\text{Ref} * 100\% \quad (3)$$

As an example, for applying a correction to the estimated analyte concentration, the correction, such as at least one of the correction functions, may be predetermined and/or stored, for example, on the mobile device 110 having the at least one camera 112.

In particular, for applying the correction to the estimated analyte concentration, one function, such as one correction function and/or code function, may be sufficient for determining the analyte concentration, such as the blood glucose concentration, in the sample. Specifically, the one correction function may take into account the assumed time span. For example, one correction function for the assumed time span, e.g., for 20 s, may be sufficient for applying the correction to the estimated analyte concentration.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

LIST OF REFERENCE NUMBERS 110 mobile device
112 camera
114 test field
116 optical test strip
18 method step a)
20 method step b)
22 method step c)
24 method step d)
26 substep i)
28 substep ii)
120 glucose concentration in mg/dl
122 intensity of the red color channel in arbitrary units
124 curve corresponding to an elapsed time span of 20 s since sample application
126 measuring points
128 intensity of the blue color channel in arbitrary units
130 5 s since sample application
132 11 s since sample application 134 17 s since sample application
136 20 s since sample application
138 23 s since sample application
140 29 s since sample application
142 35 s since sample application
144 time span elapsed since sample application in seconds
146 15 mg/di
148 50 mg/di
150 90 mg/di
152 185 mg/dl
154 310 mg/dl
156 435 mg/dl
158 650 mg/dl
160 values for $p_1$
162 values for $p_2$
164 fit curve
166 parameter $p_1$
168 parameter $p_2$
170 curve corresponding to an elapsed time span of 23 s since sample application
172 kit
174 intensity of the red, the green and the blue color channel respectively given in arbitrary units
176 time in seconds
178 temporal course of the intensity of the red color channel
180 temporal course of the intensity of the green color channel
182 temporal course of the intensity of the blue color channel
183 remission value in %
184 curve corresponding to 5 s since sample application
186 measuring points for 5 s since sample application
188 curve corresponding to assumed time span elapsed since sample application
190 deviation of glucose concentration in mg/dl

What is claimed is:

1. A method of determining a concentration of an analyte in a body fluid with a mobile device having a camera, the method comprising:
   a) prompting a user to perform one or more of applying body fluid to a test field of an optical test strip and confirming application of the application of body fluid to the test field;
   b) waiting a predetermined minimum waiting time;
   c) using the camera to capture an image of at least part of the test field having the body fluid applied thereto; and
   d) determining the concentration of the analyte in the bodily fluid based on the image captured in step c), step d) further comprising:
      i) estimating a point in time of sample application to the test field by taking into account a first item of time-dependent information derived from the image captured in step c) using a first color channel of a color space; and
      ii) estimating the concentration of the analyte by taking into account a second item of concentration-dependent information derived from the image using a second color channel of the color space, wherein the estimating of the concentration of the analyte in the bodily fluid further takes into account the estimated point in time of sample application;
   e) a refining step, comprising one or both of:
      (I) assessing plausibility of the estimated analyte concentration determined in step ii) using the first item of information, wherein the second item of information is time-dependent and wherein, in step ii) the concentration of the analyte is estimated using an assumed time span elapsed from the time of application of the body fluid, wherein the first item of information, in addition to being time-dependent, is dependent on the analyte concentration, wherein, in step e), the dependency of the first item of information on the concentration is eliminated by assuming the concentration of the analyte in the body fluid estimated in step ii), thereby deriving a probable time span elapsed from the time of the application of the body fluid to the test field from the first item of information, wherein the probable time span elapsed is compared with the assumed time span elapsed; and
      (II) improving accuracy of the estimated analyte concentration determined in step ii) using the first item of information, wherein step e) comprises applying a correction to the estimated analyte concentration, wherein the correction comprises applying a correction factor to the estimated analyte concentration and/or applying an offset to the estimated analyte concentration, wherein the correction to the estimated analyte concentration is a function of a time variable characterizing a time span elapsed between the application of the body fluid and the capturing of the image of the test field having the body fluid applied thereto.

2. The method according to claim 1, wherein the predetermined minimum waiting time is determined by using a method consisting of:
   a time span is chosen that is known to be sufficient for a detection reaction in the test field for samples having a concentration of the analyte within a predetermined concentration range to have reached a steady state;
   a predetermined time span is chosen for the minimum amount of waiting time; or
   a time span confirmed by the user in step a) is chosen for the minimum amount of waiting time.

3. The method according to claim 1, wherein the estimated analyte concentration in step ii) is determined by determining the concentration of the analyte corresponding to the second item of information using a correlation between the analyte concentration and the second item of information and by using an assumed time span elapsed from the time of application of the body fluid to the test field.

4. The method according to claim 1, wherein the refining step is iterative.

5. The method according to claim 1, wherein step e) comprises at least one of the following:
   selecting a correlation from a predetermined set of correlations, wherein each correlation describes a relationship between the first item of information and the analyte concentration for a specific time span elapsed from the time of application of the bodily fluid to the test field;
   selecting a correlation from a predetermined set of correlations, wherein each correlation describes a relationship between the first item of information and the time elapsed from the time of application of the bodily fluid to the test field for a specific analyte concentration,
   wherein step e) further comprises determining an expected first item of information corresponding to the estimated analyte concentration determined in step ii) using the correlation selected in step e), wherein step e) further comprises comparing the determined expected first item of information with the first item of information derived from the image captured in step c), wherein the estimated analyte concentration determined in step d) is classified as plausible if a difference between the expected first item of information and the first item of information derived in step i) from the image captured in step c) is equal to or smaller than a predetermined threshold value, wherein the estimated analyte concentration determined in step d) is classified as implausible if the difference between the expected first item of information and the first item of information derived in step i) is greater than the predetermined threshold value.

6. The method according to claim 1, wherein the first color channel comprises a blue color channel and wherein the second color channel comprises at least one element consisting of: a red color channel; or a green color channel.

7. The method according to claim 1, further comprising using the camera to capture a dry image of the test field not having the body fluid applied thereto.

8. The method according to claim 1, wherein step d) further comprises deriving reference information from a reference part of the optical test strip outside the test field.

9. The method according to claim 1, wherein in step c) at least two images are captured, wherein the method further comprises, between step c) and step d), comparing the second items of information of the two images.

10. A non-transitory computer-readable medium having stored thereon computer-executable instructions for performing the method according to claim 1.

11. A mobile device for performing an analytical measurement, the mobile device comprising:

at least one camera;

a processor configured to perform the steps of claim 1.

12. A kit for performing an analytical measurement, the kit comprising:

a mobile device according to claim 11; and an optical test strip having at least one test field.

* * * * *

UNITED STATES PATENT AND TRADEMARK OFFICE
CERTIFICATE OF CORRECTION

PATENT NO. : 12,235,219 B2  
APPLICATION NO. : 18/516492  
DATED : February 25, 2025  
INVENTOR(S) : Bernhard Limburg et al.

Page 1 of 1

It is certified that error appears in the above-identified patent and that said Letters Patent is hereby corrected as shown below:

In the Claims

Column 33, Line 50, the phrase "bodily fluid based on the image captured in step c), step" should read --body fluid based on the image captured in step c), step--.

Signed and Sealed this  
Twenty-second Day of July, 2025

Coke Morgan Stewart  
*Acting Director of the United States Patent and Trademark Office*